United States Patent
Lee et al.

(10) Patent No.: US 9,571,877 B2
(45) Date of Patent: *Feb. 14, 2017

(54) SYSTEMS AND METHODS TO DETERMINE MEDIA EFFECTIVENESS

(71) Applicant: The Nielsen Company (US), LLC, Schaumburg, IL (US)

(72) Inventors: Hans C. Lee, Monterey, CA (US); Timmie T. Hong, Monterey, CA (US); Michael J. Lee, Monterey, CA (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/673,077

(22) Filed: Mar. 30, 2015

(65) Prior Publication Data
US 2015/0208113 A1    Jul. 23, 2015

Related U.S. Application Data

(63) Continuation of application No. 13/659,592, filed on Oct. 24, 2012, now Pat. No. 9,021,515, which is a
(Continued)

(51) Int. Cl.
H04H 60/32    (2008.01)
H04N 21/422   (2011.01)
(Continued)

(52) U.S. Cl.
CPC ........ *H04N 21/42201* (2013.01); *G06Q 30/02* (2013.01); *H04H 60/33* (2013.01);
(Continued)

(58) Field of Classification Search
CPC .................. H04N 21/42201; H04N 21/42203; H04N 21/44213; H04N 21/44218; H04N 21/4532; H04N 21/466; H04N 21/4662; H04N 21/4666; H04N 21/4667; H04N 21/4668; H04N 21/4755; H04N 21/475; H04N 21/6582; H04N 21/812; H04N 7/173; H04N 60/33; G06Q 30/02; G06F 3/015

See application file for complete search history.

(56) References Cited

U.S. PATENT DOCUMENTS

| 4,145,122 A | 3/1979 | Rinard et al. |
| 4,610,259 A | 9/1986 | Cohen et al. |

(Continued)

FOREIGN PATENT DOCUMENTS

| EP | 1087618 | 3/2001 |
| EP | 1609418 | 12/2005 |

(Continued)

OTHER PUBLICATIONS

Egner et al., "EEG Signature and Phenomenology of Alpha/Theta Neurofeedback Training Versus Mock Feedback." Applied Psychophysiology and Biofeedback. vol. 27, No. 4, Dec. 2002, 10 pages.

(Continued)

*Primary Examiner* — An Son P Huynh
(74) *Attorney, Agent, or Firm* — Hanley, Flight & Zimmerman, LLC

(57) ABSTRACT

Example systems, methods and machine readable media are disclosed. An example system includes a synchronizer to determine a total amount to offset first-neuro-response data gathered from a subject exposed to media to align the first neuro-response data with second neuro-response data simultaneously gathered from the subject. The first neuro-response data is associated with a first sensory component of the media and the second neuro-response data is associated with a second sensory component of the media. The total amount to offset is based on a first cognitive delay associated (Continued)

with the first neuro-response data and a second cognitive delay associated with the second neuro-response data. The synchronizer is to time shift at least one of the first neuro-response data or the second neuro-response based on the total amount to form aligned data. The example system includes an analyzer to determine an effectiveness of the media based on the aligned data.

39 Claims, 16 Drawing Sheets

Related U.S. Application Data continuation of application No. 12/244,751, filed on Oct. 2, 2008, now Pat. No. 8,327,395, said application No. 13/659,592 is a continuation of application No. 12/244,752, filed on Oct. 2, 2008, now Pat. No. 8,332,883.

(60) Provisional application No. 60/977,035, filed on Oct. 2, 2007, provisional application No. 60/977,040, filed on Oct. 2, 2007, provisional application No. 60/977,042, filed on Oct. 2, 2007, provisional application No. 60/977,045, filed on Oct. 2, 2007, provisional application No. 60/984,260, filed on Oct. 31, 2007, provisional application No. 60/984,268, filed on Oct. 31, 2007, provisional application No. 60/991,591, filed on Nov. 30, 2007.

(51) Int. Cl.
| | |
|---|---|
| *G06Q 30/02* | (2012.01) |
| *H04H 60/33* | (2008.01) |
| *H04H 60/64* | (2008.01) |
| *H04N 7/173* | (2011.01) |
| *H04N 21/25* | (2011.01) |
| *H04N 21/258* | (2011.01) |
| *H04N 21/442* | (2011.01) |
| *H04N 21/475* | (2011.01) |
| *H04N 21/658* | (2011.01) |
| *H04N 21/81* | (2011.01) |

(52) U.S. Cl.
CPC .......... *H04H 60/64* (2013.01); *H04N 7/173* (2013.01); *H04N 21/252* (2013.01); *H04N 21/25866* (2013.01); *H04N 21/44213* (2013.01); *H04N 21/475* (2013.01); *H04N 21/6582* (2013.01); *H04N 21/812* (2013.01)

(56) References Cited

U.S. PATENT DOCUMENTS

| | | | |
|---|---|---|---|
| 4,626,904 A | 12/1986 | Lurie | |
| 4,686,999 A | 8/1987 | Snyder et al. | |
| 4,695,879 A | 9/1987 | Weinblatt | |
| 4,755,045 A | 7/1988 | Borah et al. | |
| 4,846,190 A | 7/1989 | John | |
| 4,870,579 A | 9/1989 | Hey | |
| 4,931,934 A | 6/1990 | Snyder | |
| 4,955,388 A | 9/1990 | Silberstein | |
| 4,973,149 A | 11/1990 | Hutchinson | |
| 4,974,602 A | 12/1990 | Abraham-Fuchs et al. | |
| 5,226,177 A | 7/1993 | Nickerson | |
| 5,243,517 A | 9/1993 | Schmidt et al. | |
| 5,331,544 A | 7/1994 | Lu et al. | |
| 5,345,281 A | 9/1994 | Taboada et al. | |
| 5,363,858 A | 11/1994 | Farwell | |
| 5,392,788 A | 2/1995 | Hudspeth | |
| 5,406,957 A | 4/1995 | Tansey | |
| 5,410,609 A | 4/1995 | Kado et al. | |
| 5,436,830 A | 7/1995 | Zaltman | |
| 5,447,166 A | 9/1995 | Gevins | |
| 5,450,855 A | 9/1995 | Rosenfeld | |
| 5,513,649 A | 5/1996 | Gevins et al. | |
| 5,537,618 A | 7/1996 | Boulton et al. | |
| 5,550,928 A | 8/1996 | Lu et al. | |
| 5,579,774 A | 12/1996 | Miller et al. | |
| 5,601,090 A | 2/1997 | Musha | |
| 5,622,168 A | 4/1997 | Keusch et al. | |
| 5,676,138 A | 10/1997 | Zawilinski | |
| 5,676,148 A | 10/1997 | Koo et al. | |
| 5,687,322 A | 11/1997 | Deaton et al. | |
| 5,692,906 A | 12/1997 | Corder | |
| 5,720,619 A | 2/1998 | Fisslinger | |
| 5,724,987 A | 3/1998 | Gevins et al. | |
| 5,726,701 A | 3/1998 | Needham | |
| 5,736,986 A | 4/1998 | Sever, Jr. | |
| 5,740,812 A | 4/1998 | Cowan | |
| 5,762,611 A | 6/1998 | Lewis et al. | |
| 5,774,591 A | 6/1998 | Black et al. | |
| 5,802,208 A | 9/1998 | Podilchuk et al. | |
| 5,802,220 A | 9/1998 | Black et al. | |
| 5,812,642 A | 9/1998 | Leroy | |
| 5,842,199 A | 11/1998 | Miller et al. | |
| 5,892,566 A | 4/1999 | Bullwinkel | |
| 5,974,262 A | 10/1999 | Fuller et al. | |
| 5,983,129 A | 11/1999 | Cowan et al. | |
| 5,983,214 A | 11/1999 | Lang et al. | |
| 5,995,868 A | 11/1999 | Dorfmeister et al. | |
| 6,001,065 A | 12/1999 | DeVito | |
| 6,016,475 A | 1/2000 | Miller et al. | |
| 6,032,129 A | 2/2000 | Greef et al. | |
| 6,088,040 A | 7/2000 | Oda et al. | |
| 6,099,319 A | 8/2000 | Zaltman et al. | |
| 6,170,018 B1 | 1/2001 | Voll et al. | |
| 6,171,239 B1 | 1/2001 | Humphrey | |
| 6,182,113 B1 | 1/2001 | Narayanaswami | |
| 6,190,314 B1 | 2/2001 | Ark et al. | |
| 6,212,502 B1 | 4/2001 | Ball et al. | |
| 6,228,038 B1 | 5/2001 | Claessens | |
| 6,236,885 B1 | 5/2001 | Hunter et al. | |
| 6,236,975 B1 | 5/2001 | Boe et al. | |
| 6,254,536 B1 | 7/2001 | DeVito | |
| 6,286,005 B1 | 9/2001 | Cannon | |
| 6,292,688 B1 | 9/2001 | Patton | |
| 6,299,308 B1 | 10/2001 | Voronka et al. | |
| 6,309,342 B1 | 10/2001 | Blazey et al. | |
| 6,315,569 B1 | 11/2001 | Zaltman | |
| 6,322,368 B1 | 11/2001 | Young et al. | |
| 6,358,201 B1 | 3/2002 | Childre et al. | |
| 6,370,513 B1 | 4/2002 | Kolawa et al. | |
| 6,422,999 B1 | 7/2002 | Hill | |
| 6,435,878 B1 | 8/2002 | Reynolds et al. | |
| 6,453,194 B1 | 9/2002 | Hill | |
| 6,453,241 B1 | 9/2002 | Bassett, Jr. et al. | |
| 6,487,444 B2 | 11/2002 | Mimura | |
| 6,577,329 B1 | 6/2003 | Flickner et al. | |
| 6,585,521 B1 | 7/2003 | Obrador | |
| 6,609,024 B1 | 8/2003 | Ryu et al. | |
| 6,615,209 B1 | 9/2003 | Gomes et al. | |
| 6,623,428 B2 | 9/2003 | Miller et al. | |
| 6,626,676 B2 | 9/2003 | Freer | |
| 6,648,822 B2 | 11/2003 | Hamamoto et al. | |
| 6,652,283 B1 | 11/2003 | Van Schaack et al. | |
| 6,656,116 B2 | 12/2003 | Kim et al. | |
| 6,678,685 B2 | 1/2004 | McGill et al. | |
| 6,678,866 B1 | 1/2004 | Sugimoto et al. | |
| 6,688,890 B2 | 2/2004 | von Buegner | |
| 6,712,468 B1 | 3/2004 | Edwards | |
| 6,792,304 B1 | 9/2004 | Silberstein | |
| 6,839,682 B1 | 1/2005 | Blume et al. | |
| 6,842,877 B2 | 1/2005 | Robarts et al. | |
| 6,850,252 B1 | 2/2005 | Hoffberg | |
| 6,852,875 B2 | 2/2005 | Prakash | |
| 6,888,457 B2 | 5/2005 | Wilkinson et al. | |
| 6,904,408 B1 | 6/2005 | McCarthy et al. | |
| 6,909,451 B1 | 6/2005 | Latypov et al. | |
| 6,978,115 B2 | 12/2005 | Whitehurst et al. | |
| 7,010,497 B1 | 3/2006 | Nyhan et al. | |

(56) References Cited

U.S. PATENT DOCUMENTS

| | | | |
|---|---|---|---|
| 7,020,508 B2 | 3/2006 | Stivoric et al. | |
| 7,035,685 B2 | 4/2006 | Ryu et al. | |
| 7,043,056 B2 | 5/2006 | Edwards et al. | |
| 7,047,550 B1* | 5/2006 | Yasukawa | H04N 5/44543 348/E5.105 |
| 7,050,753 B2 | 5/2006 | Knutson | |
| 7,113,916 B1 | 9/2006 | Hill | |
| 7,120,880 B1 | 10/2006 | Dryer et al. | |
| 7,150,715 B2 | 12/2006 | Collura et al. | |
| 7,246,081 B2 | 7/2007 | Hill | |
| 7,249,708 B2 | 7/2007 | McConnell et al. | |
| 7,340,060 B2 | 3/2008 | Tomkins et al. | |
| D565,735 S | 4/2008 | Washbon | |
| 7,359,894 B1 | 4/2008 | Liebman et al. | |
| 7,383,200 B1 | 6/2008 | Walker et al. | |
| 7,394,385 B2 | 7/2008 | Franco, Jr. et al. | |
| 7,483,844 B2 | 1/2009 | Takakura et al. | |
| 7,519,860 B2 | 4/2009 | Hatonen et al. | |
| 7,623,823 B2 | 11/2009 | Zito et al. | |
| 7,630,757 B2 | 12/2009 | Dorfmeister et al. | |
| 7,636,456 B2 | 12/2009 | Collins et al. | |
| 7,658,327 B2 | 2/2010 | Tuchman et al. | |
| 7,689,272 B2 | 3/2010 | Farwell | |
| 7,698,238 B2 | 4/2010 | Barletta et al. | |
| 7,729,755 B2 | 6/2010 | Laken | |
| 7,765,564 B2 | 7/2010 | Deng | |
| 7,774,052 B2 | 8/2010 | Burton et al. | |
| 7,797,186 B2 | 9/2010 | Dybus | |
| 7,840,250 B2 | 11/2010 | Tucker | |
| 7,844,484 B2 | 11/2010 | Arnett et al. | |
| 7,895,075 B2 | 2/2011 | Gettys et al. | |
| 7,895,625 B1* | 2/2011 | Bryan | H04N 5/782 725/46 |
| 7,917,366 B1 | 3/2011 | Levanon et al. | |
| 7,930,199 B1 | 4/2011 | Hill | |
| 7,966,012 B2 | 6/2011 | Parker | |
| 7,984,468 B2 | 7/2011 | Westberg | |
| 8,014,847 B2 | 9/2011 | Shastri et al. | |
| 8,027,518 B2 | 9/2011 | Baker et al. | |
| 8,055,722 B2 | 11/2011 | Hille | |
| 8,065,203 B1 | 11/2011 | Chien et al. | |
| 8,069,125 B2 | 11/2011 | Jung et al. | |
| 8,073,707 B2 | 12/2011 | Teller et al. | |
| 8,082,215 B2 | 12/2011 | Jung et al. | |
| 8,086,563 B2 | 12/2011 | Jung et al. | |
| 8,099,315 B2* | 1/2012 | Amento | G06Q 30/02 705/26.7 |
| 8,126,220 B2 | 2/2012 | Greig | |
| 8,151,292 B2 | 4/2012 | Lee et al. | |
| 8,151,298 B2 | 4/2012 | Begeja et al. | |
| 8,196,168 B1* | 6/2012 | Bryan | G11B 27/002 725/134 |
| 8,200,775 B2 | 6/2012 | Moore | |
| 8,235,725 B1 | 8/2012 | Hill | |
| 8,255,267 B2 | 8/2012 | Breiter | |
| 8,296,172 B2 | 10/2012 | Marci et al. | |
| 8,300,526 B2 | 10/2012 | Saito et al. | |
| 8,327,395 B2* | 12/2012 | Lee | G06Q 30/02 725/10 |
| 8,332,883 B2* | 12/2012 | Lee | G06Q 30/02 725/10 |
| 8,381,244 B2 | 2/2013 | King et al. | |
| 8,473,345 B2 | 6/2013 | Pradeep et al. | |
| 8,484,081 B2 | 7/2013 | Pradeep et al. | |
| 8,494,610 B2 | 7/2013 | Pradeep et al. | |
| 8,494,905 B2 | 7/2013 | Pradeep et al. | |
| 8,533,042 B2 | 9/2013 | Pradeep et al. | |
| 8,561,095 B2 | 10/2013 | Dimitrova et al. | |
| 8,635,105 B2 | 1/2014 | Pradeep et al. | |
| 8,744,237 B2 | 6/2014 | Baldwin et al. | |
| 8,764,652 B2 | 7/2014 | Lee et al. | |
| 8,788,372 B2 | 7/2014 | Kettner et al. | |
| 9,021,515 B2* | 4/2015 | Lee | G06Q 30/02 725/10 |
| 9,336,535 B2 | 5/2016 | Pradeep et al. | |
| 2001/0013009 A1 | 8/2001 | Greening et al. | |
| 2001/0016874 A1 | 8/2001 | Ono et al. | |
| 2001/0020236 A1 | 9/2001 | Cannon | |
| 2001/0029468 A1 | 10/2001 | Yamaguchi et al. | |
| 2001/0032140 A1 | 10/2001 | Hoffman | |
| 2001/0040591 A1 | 11/2001 | Abbott et al. | |
| 2001/0056225 A1 | 12/2001 | DeVito | |
| 2002/0053076 A1 | 5/2002 | Landesmann | |
| 2002/0055857 A1 | 5/2002 | Mault | |
| 2002/0056087 A1* | 5/2002 | Berezowski | G06Q 30/02 725/9 |
| 2002/0056124 A1 | 5/2002 | Hay | |
| 2002/0059577 A1 | 5/2002 | Lu et al. | |
| 2002/0065826 A1 | 5/2002 | Bell et al. | |
| 2002/0072952 A1 | 6/2002 | Hamzy et al. | |
| 2002/0082902 A1 | 6/2002 | Ando et al. | |
| 2002/0103429 A1 | 8/2002 | deCharms | |
| 2002/0111796 A1 | 8/2002 | Nemoto | |
| 2002/0143627 A1 | 10/2002 | Barsade et al. | |
| 2002/0154833 A1 | 10/2002 | Koch et al. | |
| 2002/0169665 A1 | 11/2002 | Hughes et al. | |
| 2002/0182574 A1 | 12/2002 | Freer | |
| 2002/0188217 A1 | 12/2002 | Farwell | |
| 2003/0003433 A1 | 1/2003 | Carpenter et al. | |
| 2003/0036955 A1 | 2/2003 | Tanaka | |
| 2003/0037333 A1 | 2/2003 | Ghashghai et al. | |
| 2003/0044050 A1 | 3/2003 | Clark et al. | |
| 2003/0063222 A1 | 4/2003 | Creed et al. | |
| 2003/0063780 A1 | 4/2003 | Gutta et al. | |
| 2003/0065524 A1 | 4/2003 | Giacchetti et al. | |
| 2003/0076369 A1 | 4/2003 | Resner et al. | |
| 2003/0081834 A1 | 5/2003 | Philomin et al. | |
| 2003/0093784 A1 | 5/2003 | Dimitrova et al. | |
| 2003/0093792 A1 | 5/2003 | Labeeb et al. | |
| 2003/0126593 A1 | 7/2003 | Mault | |
| 2003/0131351 A1* | 7/2003 | Shapira | A61B 5/16 725/24 |
| 2003/0149344 A1 | 8/2003 | Nizan | |
| 2003/0153841 A1 | 8/2003 | Kilborn | |
| 2003/0165270 A1 | 9/2003 | Endrikhovski et al. | |
| 2003/0172374 A1 | 9/2003 | Vinson et al. | |
| 2003/0204412 A1 | 10/2003 | Brier | |
| 2003/0208754 A1 | 11/2003 | Sridhar et al. | |
| 2004/0001616 A1 | 1/2004 | Gutta et al. | |
| 2004/0018476 A1 | 1/2004 | LaDue | |
| 2004/0039268 A1 | 2/2004 | Barbour et al. | |
| 2004/0055448 A1 | 3/2004 | Byon | |
| 2004/0068431 A1 | 4/2004 | Smith et al. | |
| 2004/0072133 A1 | 4/2004 | Kullok et al. | |
| 2004/0101212 A1* | 5/2004 | Fedorovskaya | G06F 17/30265 382/305 |
| 2004/0117831 A1 | 6/2004 | Ellis et al. | |
| 2004/0133081 A1 | 7/2004 | Teller et al. | |
| 2004/0187167 A1 | 9/2004 | Maguire et al. | |
| 2004/0193068 A1 | 9/2004 | Burton et al. | |
| 2004/0208496 A1 | 10/2004 | Pilu | |
| 2004/0219184 A1 | 11/2004 | Brown et al. | |
| 2004/0230989 A1 | 11/2004 | Macey et al. | |
| 2004/0267141 A1 | 12/2004 | Amano et al. | |
| 2005/0010087 A1 | 1/2005 | Banet et al. | |
| 2005/0010637 A1 | 1/2005 | Dempski et al. | |
| 2005/0041951 A1 | 2/2005 | Inoue et al. | |
| 2005/0043646 A1 | 2/2005 | Viirre et al. | |
| 2005/0043774 A1 | 2/2005 | Devlin et al. | |
| 2005/0045189 A1 | 3/2005 | Jay | |
| 2005/0047647 A1 | 3/2005 | Rutishauser et al. | |
| 2005/0060312 A1 | 3/2005 | Curtiss et al. | |
| 2005/0062637 A1 | 3/2005 | El Zabadani et al. | |
| 2005/0066307 A1 | 3/2005 | Patel et al. | |
| 2005/0071462 A1 | 3/2005 | Bodin et al. | |
| 2005/0071865 A1 | 3/2005 | Martins | |
| 2005/0079474 A1 | 4/2005 | Lowe | |
| 2005/0097594 A1 | 5/2005 | O'Donnell et al. | |
| 2005/0113649 A1 | 5/2005 | Bergantino | |
| 2005/0113656 A1 | 5/2005 | Chance | |
| 2005/0132401 A1* | 6/2005 | Boccon-Gibod | G11B 27/002 725/34 |

(56) References Cited

U.S. PATENT DOCUMENTS

| | | |
|---|---|---|
| 2005/0149964 A1* | 7/2005 | Thomas ............ G06Q 30/02 725/9 |
| 2005/0154290 A1 | 7/2005 | Langleben |
| 2005/0165766 A1 | 7/2005 | Szabo |
| 2005/0172311 A1 | 8/2005 | Hjelt et al. |
| 2005/0177058 A1 | 8/2005 | Sobell |
| 2005/0216243 A1* | 9/2005 | Graham ............ G06F 19/3437 703/11 |
| 2005/0223237 A1* | 10/2005 | Barletta ............ G06F 3/011 713/186 |
| 2005/0256905 A1 | 11/2005 | Gruhl et al. |
| 2005/0261980 A1 | 11/2005 | Hadi |
| 2005/0262542 A1 | 11/2005 | DeWeese et al. |
| 2005/0267798 A1 | 12/2005 | Panara |
| 2005/0288954 A1 | 12/2005 | McCarthy et al. |
| 2005/0289582 A1* | 12/2005 | Tavares ............ G06K 9/00221 725/10 |
| 2006/0009702 A1 | 1/2006 | Iwaki et al. |
| 2006/0010470 A1* | 1/2006 | Kurosaki ............ H04H 20/76 725/46 |
| 2006/0031882 A1 | 2/2006 | Swix et al. |
| 2006/0041548 A1 | 2/2006 | Parsons et al. |
| 2006/0042483 A1 | 3/2006 | Work et al. |
| 2006/0069663 A1 | 3/2006 | Adar et al. |
| 2006/0149337 A1 | 7/2006 | John |
| 2006/0176289 A1 | 8/2006 | Horn |
| 2006/0190822 A1 | 8/2006 | Basson et al. |
| 2006/0190966 A1 | 8/2006 | McKissick et al. |
| 2006/0218046 A1 | 9/2006 | Carfi et al. |
| 2006/0256133 A1 | 11/2006 | Rosenberg |
| 2006/0257834 A1 | 11/2006 | Lee et al. |
| 2006/0258926 A1 | 11/2006 | Ali et al. |
| 2006/0259371 A1 | 11/2006 | Perrier et al. |
| 2006/0259922 A1 | 11/2006 | Sandgren et al. |
| 2006/0277102 A1 | 12/2006 | Agliozzo |
| 2006/0293921 A1* | 12/2006 | McCarthy ............ A61B 5/6815 705/2 |
| 2007/0016096 A1 | 1/2007 | McNabb |
| 2007/0038516 A1 | 2/2007 | Apple et al. |
| 2007/0050256 A1* | 3/2007 | Walker ............ G06Q 30/00 705/14.19 |
| 2007/0053513 A1 | 3/2007 | Hoffberg |
| 2007/0055169 A1 | 3/2007 | Lee et al. |
| 2007/0060830 A1 | 3/2007 | Le et al. |
| 2007/0060831 A1 | 3/2007 | Le et al. |
| 2007/0066914 A1 | 3/2007 | Le et al. |
| 2007/0066916 A1 | 3/2007 | Lemos |
| 2007/0067305 A1 | 3/2007 | Ives |
| 2007/0078700 A1 | 4/2007 | Lenzmann et al. |
| 2007/0101360 A1 | 5/2007 | Gutta et al. |
| 2007/0112460 A1 | 5/2007 | Kiselik |
| 2007/0116037 A1 | 5/2007 | Moore |
| 2007/0124756 A1 | 5/2007 | Covell et al. |
| 2007/0130580 A1 | 6/2007 | Covell et al. |
| 2007/0136753 A1* | 6/2007 | Bovenschulte ........ H04H 60/31 725/46 |
| 2007/0143778 A1 | 6/2007 | Covell et al. |
| 2007/0150916 A1 | 6/2007 | Begole et al. |
| 2007/0162505 A1 | 7/2007 | Cecchi et al. |
| 2007/0168461 A1 | 7/2007 | Moore |
| 2007/0173733 A1 | 7/2007 | Le et al. |
| 2007/0179396 A1 | 8/2007 | Le et al. |
| 2007/0184420 A1 | 8/2007 | Mathan et al. |
| 2007/0192168 A1 | 8/2007 | Van Luchene |
| 2007/0192785 A1 | 8/2007 | Pellinat et al. |
| 2007/0209047 A1 | 9/2007 | Hallberg et al. |
| 2007/0214471 A1* | 9/2007 | Rosenberg ............ H04H 20/38 725/24 |
| 2007/0225585 A1 | 9/2007 | Washbon et al. |
| 2007/0235716 A1 | 10/2007 | Delic et al. |
| 2007/0238945 A1 | 10/2007 | Delic et al. |
| 2007/0240180 A1 | 10/2007 | Shanks et al. |
| 2007/0250846 A1 | 10/2007 | Swix et al. |
| 2007/0250901 A1 | 10/2007 | McIntire et al. |
| 2007/0265507 A1 | 11/2007 | de Lemos |
| 2007/0282566 A1 | 12/2007 | Whitlow et al. |
| 2008/0004940 A1 | 1/2008 | Rolleston Phillips |
| 2008/0065468 A1 | 3/2008 | Berg et al. |
| 2008/0091463 A1 | 4/2008 | Shakamuri |
| 2008/0091512 A1* | 4/2008 | Marci ............ G06Q 30/0242 705/7.29 |
| 2008/0133724 A1 | 6/2008 | Clark |
| 2008/0144882 A1 | 6/2008 | Leinbach et al. |
| 2008/0147488 A1 | 6/2008 | Tunick et al. |
| 2008/0147742 A1 | 6/2008 | Allen |
| 2008/0159365 A1 | 7/2008 | Dubocanin et al. |
| 2008/0162182 A1 | 7/2008 | Cazares et al. |
| 2008/0177197 A1 | 7/2008 | Lee et al. |
| 2008/0195471 A1 | 8/2008 | Dube et al. |
| 2008/0211768 A1 | 9/2008 | Breen et al. |
| 2008/0214902 A1 | 9/2008 | Lee et al. |
| 2008/0218472 A1 | 9/2008 | Breen et al. |
| 2008/0221400 A1 | 9/2008 | Lee et al. |
| 2008/0221472 A1 | 9/2008 | Lee et al. |
| 2008/0221969 A1 | 9/2008 | Lee et al. |
| 2008/0222670 A1 | 9/2008 | Lee et al. |
| 2008/0222671 A1* | 9/2008 | Lee ............ H04H 60/31 725/10 |
| 2008/0249834 A1 | 10/2008 | Zigmond et al. |
| 2008/0249865 A1 | 10/2008 | Angell et al. |
| 2008/0275830 A1 | 11/2008 | Greig |
| 2008/0306398 A1 | 12/2008 | Uchiyama et al. |
| 2009/0018996 A1 | 1/2009 | Hunt et al. |
| 2009/0024049 A1 | 1/2009 | Pradeep et al. |
| 2009/0024447 A1 | 1/2009 | Pradeep et al. |
| 2009/0024448 A1 | 1/2009 | Pradeep et al. |
| 2009/0024449 A1 | 1/2009 | Pradeep et al. |
| 2009/0024475 A1 | 1/2009 | Pradeep et al. |
| 2009/0024747 A1 | 1/2009 | Moses et al. |
| 2009/0025023 A1 | 1/2009 | Pradeep et al. |
| 2009/0030287 A1 | 1/2009 | Pradeep et al. |
| 2009/0030303 A1 | 1/2009 | Pradeep et al. |
| 2009/0030717 A1 | 1/2009 | Pradeep et al. |
| 2009/0030780 A1 | 1/2009 | York et al. |
| 2009/0030930 A1 | 1/2009 | Pradeep et al. |
| 2009/0036755 A1 | 2/2009 | Pradeep et al. |
| 2009/0036756 A1 | 2/2009 | Pradeep et al. |
| 2009/0062629 A1 | 3/2009 | Pradeep et al. |
| 2009/0062679 A1 | 3/2009 | Tan et al. |
| 2009/0062681 A1 | 3/2009 | Pradeep et al. |
| 2009/0063255 A1 | 3/2009 | Pradeep et al. |
| 2009/0063256 A1 | 3/2009 | Pradeep et al. |
| 2009/0070798 A1 | 3/2009 | Lee et al. |
| 2009/0082643 A1 | 3/2009 | Pradeep et al. |
| 2009/0082692 A1* | 3/2009 | Hale ............ A61B 5/0476 600/544 |
| 2009/0083129 A1 | 3/2009 | Pradeep et al. |
| 2009/0088610 A1 | 4/2009 | Lee et al. |
| 2009/0094286 A1 | 4/2009 | Lee et al. |
| 2009/0094627 A1 | 4/2009 | Lee et al. |
| 2009/0094628 A1 | 4/2009 | Lee et al. |
| 2009/0094629 A1 | 4/2009 | Lee et al. |
| 2009/0105576 A1 | 4/2009 | Do et al. |
| 2009/0112077 A1 | 4/2009 | Nguyen et al. |
| 2009/0132441 A1 | 5/2009 | Muller et al. |
| 2009/0133047 A1 | 5/2009 | Lee et al. |
| 2009/0138356 A1 | 5/2009 | Pomplun |
| 2009/0150919 A1 | 6/2009 | Lee et al. |
| 2009/0153328 A1 | 6/2009 | Otani et al. |
| 2009/0156907 A1 | 6/2009 | Jung et al. |
| 2009/0156925 A1 | 6/2009 | Jin et al. |
| 2009/0156955 A1 | 6/2009 | Jung et al. |
| 2009/0163777 A1 | 6/2009 | Jung et al. |
| 2009/0164132 A1 | 6/2009 | Jung et al. |
| 2009/0171164 A1 | 7/2009 | Jung et al. |
| 2009/0187467 A1 | 7/2009 | Fang et al. |
| 2009/0214060 A1 | 8/2009 | Chuang et al. |
| 2009/0221928 A1 | 9/2009 | Einav et al. |
| 2009/0222330 A1 | 9/2009 | Leinbach |
| 2009/0249223 A1* | 10/2009 | Barsook ............ H04N 7/15 715/753 |
| 2009/0253996 A1 | 10/2009 | Lee et al. |
| 2009/0259509 A1 | 10/2009 | Landvater |

(56) References Cited

U.S. PATENT DOCUMENTS

| | | |
|---|---|---|
| 2009/0271294 A1 | 10/2009 | Hadi |
| 2009/0300672 A1 | 12/2009 | Van Gulik |
| 2009/0305006 A1 | 12/2009 | Steffen |
| 2009/0318773 A1 | 12/2009 | Jung et al. |
| 2009/0327068 A1 | 12/2009 | Pradeep et al. |
| 2009/0328089 A1 | 12/2009 | Pradeep et al. |
| 2009/0328122 A1 | 12/2009 | Amento et al. |
| 2010/0004977 A1 | 1/2010 | Marci et al. |
| 2010/0094702 A1 | 4/2010 | Silberstein |
| 2010/0180029 A1 | 7/2010 | Fourman |
| 2010/0228604 A1 | 9/2010 | Desai et al. |
| 2010/0292998 A1 | 11/2010 | Bodlaender et al. |
| 2011/0153423 A1 | 6/2011 | Elvekrog et al. |
| 2012/0321271 A1 | 12/2012 | Baldwin et al. |
| 2013/0046577 A1 | 2/2013 | Marci et al. |
| 2013/0117771 A1 | 5/2013 | Lee et al. |
| 2013/0185140 A1 | 7/2013 | Pradeep et al. |
| 2013/0185141 A1 | 7/2013 | Pradeep et al. |
| 2013/0185142 A1 | 7/2013 | Pradeep et al. |
| 2013/0185145 A1 | 7/2013 | Pradeep et al. |
| 2013/0304540 A1 | 11/2013 | Pradeep et al. |
| 2013/0332259 A1 | 12/2013 | Pradeep et al. |
| 2014/0164095 A1 | 6/2014 | Pradeep et al. |
| 2014/0221866 A1 | 8/2014 | Quy |
| 2014/0244345 A1 | 8/2014 | Sollis et al. |

FOREIGN PATENT DOCUMENTS

| | | |
|---|---|---|
| GB | 2221759 | 2/1990 |
| JP | 2001147944 | 5/2001 |
| JP | 2005051654 | 2/2005 |
| JP | 2005160805 | 6/2005 |
| JP | 2006006355 | 1/2006 |
| JP | 2006227994 | 8/2006 |
| JP | 2006305334 | 11/2006 |
| KR | 20000072489 | 12/2000 |
| KR | 20010104579 | 11/2001 |
| KR | 200422399 | 7/2006 |
| WO | 2008030831 | 3/2008 |
| WO | 2008055078 | 5/2008 |
| WO | 2008064431 | 6/2008 |
| WO | 2008121651 | 10/2008 |
| WO | 2008137579 | 11/2008 |
| WO | 2008137581 | 11/2008 |
| WO | 2008141340 | 11/2008 |
| WO | 2008154410 | 12/2008 |
| WO | 2009018374 | 2/2009 |

OTHER PUBLICATIONS

El-Bab, "Cognitive Event Related Potentials During a Learning Task," Doctoral Dissertation, Faculty of Medicine, University of Southampton, UK, 2010, 25 pages.

Engel, et al., "Dynamic Predictions: Oscillations and Synchrony in Top-Down Processing," Macmillan Magazines Ltd, vol. 2, Oct. 2001, 13 pages.

Fries, "A Mechanism for Cognitive Dynamics: Neuronal Communication Through Neuronal Coherence," TRENDS in Cognitive Sciences vol. 9 No. 10, Oct. 2005, 7 pages.

Gazzaley, et al., "Top-down Enhancement and Suppression of the Magnitude and Speed of Neural Activity," Massachusetts Institute of Technology, Journal of Cognitive Neuroscience, No. 17:3, 2005, 11 pages.

Gevins et al., "High-resolution EEG Mapping of Cortical Activation Related to a Working Memory: Effects of Task Difficulty, Type of Processing, and Practice," Cerebral Cortex, vol. 7, No. 4, Jun. 1997, 12 pages.

Government of Newfoundland and Labrador, "Who Responded," Budget 1996, http://www.budget.gov.nl.ca/budget96/who.gif, 1996, 1 page.

Harmony et al., "Specific EEG frequencies signal general common cognitive processes as well as specific tasks processes in man," International Journal of Psychophysiology, vol. 53, 2004, 10 pages.

Haq, "This Is Your Brain on Advertising," BusinessWeek.com, http://www.businessweek.com/print/globalbiz/content/oct2007/gb2007108_286282.htm, Oct. 8, 2007, 3 pages.

Hazlett et al., "Emotional Response to Television Commercials: Facial EMG vs. Self-Report," Journal of Advertising Research, Apr. 1999, 17 pages.

Hopf, et al., "Neural Sources of Focused Attention in Visual Search," Cerebral Cortex, vol. 10, No. 12, Dec. 2000, 9 pages.

Hughes et al., "Conventional and Quantitative Electroencephalography in Psychiatry," Journal of Neuropsychiatry and Clinical Neurosciences, vol. 11, No. 2, Spring 1999, 19 pages.

Klimesch et al., "Episodic and semantic memory: an analysis in the EEG theta and alpha band," Electroencephaloqraphv and Clinical Neurophysiology, vol. 91, 1994, pp. 428-441, 14 pages.

Lee et al., "What is 'neuromarketing'? A discussion and agenda for future research," International Journal of Psychophysiology, vol. 63, 2007, pp. 199-204, 6 pages.

Lewis et al., "Market Researchers make Increasing use of Brain Imaging," ACNR, vol. 5, No. 3, Jul./Aug. 2005, pp. 36-37, 2 pages.

Makeig, et al., "Mining event-related brain dynamics," TRENDS in Cognitive Sciences, vol. 8, No. 5, May 2004, 7 pages.

Mizuhara et al., "A long range cortical network emerging with theta oscillation in mental task," Neuroreport, vol. 15, No. 8, Jun. 7, 2004, pp. 1233-1238, 11 pages.

Oxford English Dictionary, Definition of "Question," retrieved from oed.com on Nov. 11, 2011, 2 pages.

Page et al., "Cognitive Neuroscience, Marketing and Research," Congress 2006—Foresight—The Predictive Power of Research Conference Papers, ESOMAR Publications, Sep. 17, 2006, 25 pages.

Ruchkin et al., "Modality-specific processing streams in verbal working memory: evidence from spatiotemporal patterns of brain activity," Cognitive Brain Research, vol. 6, 1997, pp. 95-113, 19 pages.

Selden, "Machines that Read Minds," Science Digest, Oct. 1981, 9 pages.

Sutherland, "Neuromarketing: What's it all about?," retrieved from Max Sutherland's Weblog on Aug. 23, 2011, http://www.sutherlandsurvey.com/Column_pages/Neuromarketing_whats_it_all_about.htm, Mar. 2007, 5 pages.

Innerscope Research, "Technology Platform: SmartShirt + Eye-Tracking," Mar. 2007, 1 page.

Willis et al., Discover Your Child's Learning Style: Children Learn in Unique Ways—Here's the Key to Every Child's Learning Success, Prime Publishing, Roseville, CA, pp. 13-15, 20-22, 143-156, 1999, 22 pages.

Wise, The High Performance Mind, Mastering Brainwaves for Insight, Healing and Creativity, Penguin Putnam Inc., New York, 1996, pp. 13-14, 16, 42, 44-47, 50, 11pages.

Wise, The High Performance Mind, Mastering Brainwaves for Insight, Healing and Creativity, Penguin Putnam Inc., New York, 1996, pp. 156-158; 165-170; 186-187, 189-192, 15 pages.

Ziegenfuss, "Neuromarketing: Advertising Ethical & Medical Technology," The Brownstone Journal, vol. XII, May 2005, 9 pages.

Notice of Allowance, issued by the United States Patent and Trademark Office in connection with U.S. Appl. No. 13/659,592, on Dec. 24, 2014, 65 pages.

Non-Final Office Action, issued by the United States Patent and Trademark Office in connection with U.S. Appl. No. 12/263,331, on Jun. 1, 2015, 37 pages.

McClure, Samuel, et al., "Neural Correlates of Behavioral Preference for Culturally Familiar Drinks," Neuron (Oct. 14, 2004), 379-387, 9 pages.

Final Office Action, issued by the United States Patent and Trademark Office in connection with U.S. Appl. No. 12/263,331, on Aug. 2, 2013, 56 pages.

Advisory Action, issued by the United States Patent and Trademark Office in connection with U.S. Appl. No. 12/263,331, on Dec. 16, 2013, 6 pages.

Non-Final Office Action, issued by the United States Patent and Trademark Office in connection with U.S. Appl. No. 12/263,331, on Jan. 15, 2014, 22 pages.

(56) References Cited

OTHER PUBLICATIONS

Final Office Action, issued by the United States Patent and Trademark Office in connection with U.S. Appl. No. 12/263,331, on Jul. 31, 2014, 29 pages.
Beaver, John D., et al., "Individual Differences in Reward Drive Predict Neural Responses to Images of Food", J. of Neuroscience, May 10, 2006, pp. 5160-5166, 7 pages.
Cassanello, Carlos R., et al., "Neuronal Responses to Moving Targets in Monkey Frontal Eye Fields", Journal of Neurophysiology, Sep. 2008, pp. 1544-1556, 16 pages.
Darrow, Chester, "Psychological and Psychophysiological Significance of the Electroencephalogram," Psychological Review, May 1947, pp. 157-168, 12 pages.
Duchowski, "A Breadth-First Survey of Eye-tracking Applications," Behavior Research Methods, Instruments, and Computers, Nov. 2002, pp. 455-470, 16 pages.
Ekman, P., Friesen, W., "Measuring Facial Movement," Environmental Psychology and Nonverbal Behavior, vol. 1, No. 1, Fall 1976, pp. 56-75, 20 pages.
Enghoff, Sigurd, Thesis: "Moving ICA and Time-Frequency Analysis in Event-Related EEG Studies of Selective Attention," Technical University of Denmark, Dec. 1999, 54 pages.
Ekman, P., Friesen, W.V., Facial Action Coding System: A Technique for Measurement of Facial Movement, Consulting Psychologists Press, Palo Alto, California, 1978.
Ekman, P., Friesen, W., Unmasking the Face—A Guide to Recognizing Emotions from Facial Clues, Prentice-Hall, Inc., Englewood Cliffs, New Jersey, 1979.
Ekman, P., Friesen, W., Ancoli, S., "Facial Signs of Emotional Experience," J. Personality & Social Psychology, vol. 39, No. 6, Dec. 1980, pp. 1125-1134, 10 pages.
Heo et al., "Wait! Why is it Not Moving? Attractive and Distractive Ocular Responses to Web Ads," Paper presented to AEJMC, Aug. 2001, Washington DC, http://www.psu.edu/dept/medialab/researchpage/newabstracts/wait.html, 3 pages.
Izard, C. E., The Maximally Discriminative Facial Movement Coding System, (Rev. ed.), Instructional Resources Center, University of Delaware, Newark, Delaware, 1983.
Izard, C., Dougherty, L., Hembree, E., A System for Identifying Affect Expressions by Holistic Judgments (AFFEX), Instructional Resources Center, University of Delaware, Newark, Delaware, 1983.
Jaimes, A., Sebe, N., "Multimodal Human-Computer Interaction: A Survey," Computer Vision and Image Understanding 108, Oct.-Nov. 2007, pp. 116-134, 19 pages.
Jia, X., Nixon, M.S., "Extending the Feature Set for Automatic Face Recognition," International Conference on Image Processing and Its Applications, Apr. 7-9, 1992, 6 pages.
Lisetti, C., Nasoz, F., "Using Noninvasive Wearable Computers to Recognize Human Emotions from Physiological Signals," EURASIP J. Applied Signal Processing, No. 11, Sep. 2004, pp. 1672-1687, 16 pages.
Mehta, A. et al., "Reconsidering Recall and Emotion in Advertising", Journal of Advertising Research, Mar. 2006, pp. 49-56, 9 pages.
Rothschild et al., "Predicting Memory for Components of TV Commercials from EEG," Journal of Consumer Research, Mar. 1990, pp. 472-478, 8 pages.
Shandlen, Michael N. et al., "A Computational Analysis of the Relationship between Neuronal and Behavioral Responses to Visual Motion", The Journal of Neuroscience, Feb. 15, 1996, pp. 1486-1510, 25 pages.
Non-Final Office Action, issued by the United States Patent and Trademark Office in connection with U.S. Appl. No. 12/244,748, on Dec. 17, 2010, 35 pages.
Non-Final Office Action, issued by the United States Patent and Trademark Office in connection with U.S. Appl. No. 12/244,751, on Feb. 7, 2011, 48 pages.
Non-Final Office Action, issued by the United States Patent and Trademark Office in connection with U.S. Appl. No. 12/244,752, on Feb. 18, 2011, 34 pages.
Non-Final Office Action, issued by the United States Patent and Trademark Office in connection with U.S. Appl. No. 12/326,016, on Mar. 21, 2011, 41 pages.
Non-Final Office Action, issued by the United States Patent and Trademark Office in connection with U.S. Appl. No. 12/244,737, on May 16, 2011, 42 pages.
Notice of Allowance, issued by the United States Patent and Trademark Office in connection with U.S. Appl. No. 12/244,748, on Aug. 30, 2011, 19 pages.
Final Office Action, issued by the United States Patent and Trademark Office in connection with U.S. Appl. No. 12/244,751, on Sep. 7, 2011, 29 pages.
Non-Final Office Action, issued by the United States Patent and Trademark Office in connection with U.S. Appl. No. 12/263,350, on Oct. 24, 2011, 21 pages.
Final Office Action, issued by the United States Patent and Trademark Office in connection with U.S. Appl. No. 12/244,752, on Nov. 23, 2011, 22 pages.
Final Office Action, issued by the United States Patent and Trademark Office in connection with U.S. Appl. No. 12/244,737, on Nov. 29, 2011, 37 pages.
Final Office Action, issued by the United States Patent and Trademark Office in connection with U.S. Appl. No. 12/326,016, on Nov. 30, 2011, 27 pages.
Restriction Requirement, issued by the United States Patent and Trademark Office in connection with U.S. Appl. No. 12/263,331, on Jan. 19, 2012, 10 pages.
Notice of Allowance, issued by the United States Patent and Trademark Office in connection with U.S. Appl. No. 12/244,752, on May 29, 2012, 35 pages.
Notice of Allowance, issued by the United States Patent and Trademark Office in connection with U.S. Appl. No. 12/244,751, on Jun. 12, 2012, 47 pages.
Notice of Allowance, issued by the United States Patent and Trademark Office in connection with U.S. Appl. No. 12/244,751, on Jul. 26, 2012, 19 pages.
Notice of Allowance, issued by the United States Patent and Trademark Office in connection with U.S. Appl. No. 12/244,752, on Sep. 7, 2012, 32 pages.
Restriction Requirement, issued by the United States Patent and Trademark Office in connection with U.S. Appl. No. 12/263,331, on Sep. 14, 2012, 9 pages.
Non-Final Office Action, issued by the United States Patent and Trademark Office in connection with U.S. Appl. No. 12/263,331, on Jan. 7, 2013, 43 pages.
First Office Action, issued by the State Intellectual Property Office of P.R. China in connection with Patent Application No. 200880123640.4, on Feb. 29, 2012, with English translation, 14 pages.
Form PCT/ISA/237, PCT/US07/15019, "Written Opinion of the International Searching Authority," Jun. 11, 2008, 5 pages.
Form PCT/ISA/210, PCT/US07/15019, "International Search Report," Jun. 11, 2008, 1 page.
Form PCT/IB/373, PCT/US07/15019, "International Preliminary Report on Patentability," Sep. 8, 2009, 7 pages.
Form PCT/ISA/237, PCT/US07/14955, "Written Opinion of the International Searching Authority," Jul. 3, 2008, 6 pages.
Form PCT/ISA/210, PCT/US07/14955, "International Search Report," Jul. 3, 2008, 1 page.
Form PCT/IB/373, PCT/US07/14955, "International Preliminary Report on Patentability." Sep. 8, 2009, 7 pages.
Form PCT/ISA/237, PCT/US07/16796, "Written Opinion of the International Searching Authority," Jul. 3, 2008, 6 pages.
Form PCT/ISA/210, PCT/US07/16796, "International Search Report," Jul. 3, 2008, 1 page.
Form PCT/IB/373, PCT/US07/16796, "International Preliminary Report on Patentability," Sep. 8, 2009, 7 pages.
Form PCT/ISA/237, PCT/US06/031569, "Written Opinion of the International Searching Authority," Feb. 20, 2007, 6 pages.

(56) References Cited

OTHER PUBLICATIONS

Form PCT/ISA/210, PCT/US06/031569, "International Search Report," Feb. 20, 2007, 2 pages.
Form PCT/IB/373, PCT/US06/031569, "International Preliminary Report on Patentability," Mar. 4, 2008, 7 pages.
Form PCT/ISA/237, PCT/US07/20714, "Written Opinion of the International Searching Authority," Apr. 8, 2008, 6 pages.
Form PCT/ISA/210, PCT/US07/20714, "International Search Report," Apr. 8, 2008, 1 page.
Form PCT/IB/373, PCT/US07/20714, "International Preliminary Report on Patentability," Sep. 8, 2009, 7 pages.
Form PCT/ISA/237, PCT/US07/17764, "Written Opinion of the International Searching Authority," May 6, 2008, 7 pages.
Form PCT/ISA/210, PCT/US07/17764, "International Search Report," May 6, 2008, 1 page.
Form PCT/IB/373, PCT/US07/17764, "International Preliminary Report on Patentability," Sep. 8, 2009, 8 pages.
Form PCT/ISA/237, PCT/US07/20713, "Written Opinion of the International Searching Authority," May 13, 2008, 5 pages.
Form PCT/ISA/210, PCT/US07/20713, "International Search Report," May 13, 2008, 1 page.
Form PCT/IB/373, PCT/US07/20713, "International Preliminary Report on Patentability," Sep. 8, 2009, 6 pages.
Form PCT/ISA/237, PCT/US08/009110, "Written Opinion of the International Searching Authority," Feb. 20, 2009, 4 pages.
Form PCT/ISA/210, PCT/US08/009110, "International Search Report," Feb. 20, 2009, 2 pages.
Form PCT/IB/373, PCT/US08/009110, "International Preliminary Report on Patentability," Jan. 26, 2010, 5 pages.
Form PCT/ISA/237, PCT/US08/75640, "Written Opinion of the International Searching Authority," Nov. 7, 2008, 3 pages.
Form PCT/ISA/210, PCT/US08/75640, "International Search Report," Nov. 7, 2008, 1 page.
Form PCT/IB/373, PCT/US08/75640, "International Preliminary Report on Patentability," Mar. 9, 2010, 4 pages.
Form PCT/ISA/237, PCT/US08/78633, "Written Opinion of the International Searching Authority," Dec. 5, 2008, 6 pages.
Form PCT/ISA/210, PCT/US08/78633, "International Search Report," Dec. 5, 2008, 1 page.
Form PCT/IB/373, PCT/US08/78633, "International Preliminary Report on Patentability," Apr. 7, 2010, 7 pages.
Form PCT/ISA/237, PCT/US08/82147, "Written Opinion of the International Searching Authority," Jan. 21, 2009, 14 pages.
Form PCT/ISA/210, PCT/US08/82147, "International Search Report," Jan. 21, 2009, 1 page.
Form PCT/IB/373, PCT/US08/82147, "International Preliminary Report on Patentability," May 4, 2010, 15 pages.
Form PCT/ISA/237, PCT/US08/82149, "Written Opinion of the International Searching Authority," Jan. 21, 2009, 14 pages.
Form PCT/ISA/210, PCT/US08/82149, "International Search Report," Jan. 21, 2009, 1 page.
Form PCT/IB/373, PCT/US08/82149, "International Preliminary Report on Patentability," May 4, 2010, 15 pages.
Form PCT/ISA/237, PCT/US08/75651, "Written Opinion of the International Searching Authority," Nov. 28, 2008, 9 pages.
Form PCT/ISA/210, PCT/US08/75651, "International Search Report," Nov. 28, 2008, 1 page.
Form PCT/IB/373, PCT/US08/75651, "International Preliminary Report on Patentability," Mar. 9, 2010, 10 pages.
Form PCT/ISA/237, PCT/US08/85723, "Written Opinion of the International Searching Authority," Mar. 20, 2009, 7 pages.
Form PCT/ISA/210, PCT/US08/85723, "International Search Report," Mar. 20, 2009, 1 page.
Form PCT/IB/373, PCT/US08/85723, "International Preliminary Report on Patentability," Jun. 22, 2010, 8 pages.
Form PCT/ISA/237, PCT/US08/85203, "Written Opinion of the International Searching Authority," Feb. 27, 2009, 6 pages.
Form PCT/ISA/210, PCT/US08/85203, "International Search Report," Feb. 27, 2009, 1 page.
Form PCT/IB/373, PCT/US08/85203, "International Preliminary Report on Patentability," Jun. 2, 2010, 7 pages.
Form PCT/ISA/237, PCT/US08/75649, "Written Opinion of the International Searching Authority," Nov. 19, 2008, 5 pages.
Form PCT/ISA/210, PCT/US08/75649, "International Search Report," Nov. 19, 2008, 1 page.
Form PCT/IB/373, PCT/US08/75649, "International Preliminary Report on Patentability," Mar. 9, 2010, 6 pages.
Aaker et al., "Warmth in Advertising: Measurement, Impact, and Sequence Effects," Journal of Consumer Research, vol. 12, No. 4, Mar. 1986, pp. 365-381, 18 pages.
Ambler et al., "Ads on the Brain; A Neuro-Imaging Comparison of Cognitive and Affective Advertising Stimuli," London Business School, Centre for Marketing Working Paper, No. 00-902, Mar. 2000, 23 pages.
Ambler, "Salience and Choice: Neural Correlates of Shopping Decisions," Psychology & Marketing, vol. 21, No. 4, Apr. 2004, pp. 247-261, 16 pages.
Bagozzi et al., "The Role of Emotions in Marketing," Journal of the Academy of Marketing Science, vol. 27, No. 2, 1999, pp. 184-206, 23 pages.
Belch et al., "Psychophysiological and Cognitive Responses to Sex in Advertising," Advances in Consumer Research, vol. 9, 1982, pp. 424-427, 6 pages.
Blakeslee, "If You Have a 'Buy Button' in Your Brain, What Pushes It?" The New York Times, www.nytimes.com, Oct. 19, 2004, 3 pages.
Braeutigam, "Neuroeconomics—From Neural Systems to Economic Behavior," Brain Research Bulletin, vol. 67, 2005, pp. 355-360, 6 pages.
Carter, "Mapping the Mind," University of California Press, Berkley, 1998, p. 28, 3 pages.
Clarke et al., "EEG Analysis of Children with Attention-Deficit/ Hyperactivity Disorder and Comorbid Reading Disabilities," Journal of Learning Disabilities, vol. 35, No. 3, May-Jun. 2002, pp. 276-285, 10 pages.
Crawford et al., "Self-Generated Happy and Sad Emotions in Low and Highly Hypnotizable Persons During Waking and Hypnosis: Laterality and Regional EEG Activity Differences," International Journal of Psychophysiology, vol. 24, Dec. 1996, 28 pages.
Desmet, "Measuring Emotion: Development and Application of an Instrument to Measure Emotional Responses to Products," to be published in Funology: From Usability to Enjoyment, pp. 111-123, Kluwer Academic Publishers, Blythe et al., eds., 2004, 13 pages.
Landau et al., "Different Effects of Voluntary and Involunatry Attention on EEG Activity in the Gamma Band," The Journal of Neuroscience 27(44), Oct. 31, 2007, pp. 11986-11990, 5 pages.
Kamba et al., "The Krakatoa Chronicle—An Interactive, Personalized Newspaper on the Web," available at: http://www.w3.org/Conferences/WWW4/Papers/93/ (retrieved on Apr. 11, 2016,) 11 pages.
Ehrenberg et al., "Understanding Brand Performance Measures: Using Dirichlet Benchmarks," 2004, Journal of Business Research, vol. 57, pp. 1307-1325, 19 pages.
Leeflang et al., "Building Models for Marketing Decisions," 2000, Springer Science + Business Media, pp. 192-235, 482-521, 86 pages.
Bhattacharya, "Is your brand's loyalty too much, too little, or just right?: Explaining deviations in loyalty from the Dirichlet norm," 1997, International Journal of Research in Marketing, vol. 14, pp. 421-435, 15 pages.
Nikolaeva et al., "The Moderating Role of Consumer and Product Characteristics on the Value of Customized On-Line Recommendations," 2006, International Journal of Electronic Commerce, vol. 11, No. 2, pp. 101-123, 24 pages.
Ehrenberg, "New Brands and the Existing Market," 1991, International Journal of Market Research, vol. 33, No. 4, 10 pages.
Foxall, "The Substitutability of Brands," 1999, Managerial and Decision Economics, vol. 20, pp. 241-257, 17 pages.
Pammer, "Forecasting the Penetration of a New Product—A Bayesian Approach," 2000, Journal of Business and Economic Statistics, vol. 18, No. 4, pp. 428-435, 8 pages.

(56) References Cited

OTHER PUBLICATIONS

Rungie et al., "Calculation of Theoretical Brand Performance Measures from the Parameters of the Dirichlet Model," 2004, Marketing Bulletin, Massey University, 15, Technical Note 2, pp. 1-19, 20 pages.
Uncles et al.., "Patterns of Buyer Behavior: Regularities, Models, and Extensions," 1995, Marketing Science, vol. 14, No. 3, pp. G71-G78, 9 pages.
Boltz, "The cognitive processing of film and musical soundtracks," Haverford College, Haverford, Pennsylvania, 2004, 32 (7), 1194-1205, 12 pages.
Christie et al., "Autonomic specificity of discrete emotion and dimensions of affective space: a multivariate approach," International Journal of Psychophysiology, 51 (2004) 143-153, 11 pages.
Coombes et al., "Emotion and movement: Activation of defensive circuitry alters the magnitude of a sustained muscle contraction," University of Florida, USA, Neuroscience Letters 396 (2006) 192-196, 5 pages.
Cryer et al. "Pull the Plug on Stress," Harvard Business Review, Jul. 2003, 8 pages.
Demaree et al., "Predicting facial valence to negative stimuli from resting RSA: Not a function of active emotion regulation," Cognition and Emotion vol. 20, Issue 2, 2006, pp. 161-176, published on Sep. 9, 2010, http://www.tandfonline.com/doi/abs/10.1080/02699930500260427, 6 pages. (Abstract provided).
Ekman et al., "Autonomic Nervous System Activity Distinguishes among Emotions," Science, New Series, vol. 221, No. 4616. (Sep. 16, 1983), pp. 1208-1210, http://links.jstor.org/sici?sici=0036-8075%2819830916%293%3A221%3A4616%3C1208%3AANSA-DA%3E2.0.CO%3B2-H, 5 pages.
Elton, "Measuring emotion at the symphony," The Boston Globe, Apr. 5, 2006, http://www.psych.mcgill.ca/labs/levitin/media/measuring_emotion_boston.html, 3 pages.
Goldberg, "Getting wired could help predict emotions," The Boston Globe, Jun. 13, 2005, http://www.boston.com/yourlife/health/mental/articles/2005/06/13/getting_wired_could_help_predict_emotions/?page=full, 4 pages.
Gomez et al., "Respiratory Responses Associated with Affective Processing of Film Stimuli," Biological Psychology, vol. 68, Issue 3, Mar. 2005, pp. 223-235, 2 pages. (Abstract provided).
Hall, "Is cognitive processing the right dimension," World Advertising Research Center, Jan. 2003, 3 pages.
Hall, "On Measuring the Power of Communications," Journal of Advertising Research, 44, pp. 1-11, doi:10.1017/S0021849904040139, Jun. 2004, 1 page. (Abstract provided).
Hall, "Research and strategy: a fall from grace," ADMAP, Issue 443, pp. 18-20, 2003, 1 page. (Abstract provided).
Hubert et al., "Autonomic, neuroendocrine, and subjective responses to emotion-inducing film stimuli," Int J Psychophysiol,Aug. 1991, 2 pages. (Abstract provided).
Levenson et al., "Emotion and Autonomic Nervous System Activity in the Minangkabau of West Sumatra," Department of Psychology, University of California, Berkeley, Journal of Personality and Social Psychology, 1992, 2 pages. (Abstract provided).
Marci et al., "The effect of emotional distance on psychophysiologic concordance and perceived empathy between patient and interviewer," Applied Psychophysiology and Biofeedback, Jun. 2006, vol. 31, issue 2, 31:115-129, 8 pages. (Abstract provided).
McCraty et al., "Analysis of twenty-four hour heart rate variability in patients with panic disorder," Biological Psychology, vol. 56, Issue 2, Jun. 2001, pp. 131-150, 1 page. (Abstract provided).
McCraty et al., "Electrophysiological Evidence of Intuition: Part 1. The Surprising Role of the Heart," The Journal of Alternative and Complementary Medicine, vol. 10, No. 1, 2004, pp. 133-143, Mary Ann Liebert, Inc., 12 pages.
McCraty et al., "Electrophysiological Evidence of Intuition: Part 2. A System-Wide Process?," The Journal of Alternative and Complementary Medicine, vol. 10, No. 2, 2004, pp. 325-336, Mary Ann Liebert, Inc., 12 pages.

McCraty et al., "The Effects of Different Types of Music on Mood, Tension, and Mental Clarity," Original Research, Alternative Therapies, Jan. 1998, vol. 4., No. 1, pp. 75-84, 10 pages.
McCraty et al., "The Effects of Emotions on Short-Term Power Spectrum Analysis of Heart Rate Variability," The American Journal of Cardiology, vol. 76, No. 14, Nov. 15, 1995, pp. 1089-1093, 6 pages.
McCraty et al., "The Impact of a New Emotional Self-Management Program on Stress, Emotions, Heart Rate Variability, DHEA and Cortisol," Integrative Physiological and Behavioral Science, Apr.-Jun. 1998, vol. 33, No. 2, 151-170, 20 pages.
McCraty et al., "The Impact of an Emotional Self -Management Skills Course on Psychosocial Functioning and Autonomic Recovery to Stress in Middle School Children," Integrative Physiological and Behavioral Science, Oct.-Dec. 1999, vol. 34, No. 4, 246-268, 23 pages.
Melillo, "Inside The Consumer Mind; What Neuroscience Can Tell Us About Marketing," Adweek, Public Citizen's Commercial Alert, Jan. 16, 2006, http://www.adweek.com/news/advertising/inside-consumer-mind-83549, 8 pages.
Miller et al., "Influence of Specific Emotional States on Autonomic Reactivity and Pulmonary Function in Asthmatic Children," Journal of the American Academy of Child & Adolescent Psychiatry, vol. 36, Issue 5, May 1997, pp. 669-677, 3 pages. (Abstract provided).
Murphy et al., "The Heart Reinnervates After Transplantation," Official Journal of the Society of Thoracic Surgeons and the Southern Thoracic Surgical Association, Jun. 2000, vol. 69, Issue 6, pp. 1769-1781, 13 pages.
Rosenberg, "Emotional R.O.I.," The Hub, May/Jun. 2006, pp. 24-25, 2 pages.
Tiller et al., "Cardiac Coherence: A New, Noninvasive Measure of Autonomic Nervous System Order," Alternative Therapies, Jan. 1996, vol. 2, No. 1, 14 pages.
Umetani et al. "Twenty-Four Hour Time Domain Heart Rate Variability and Heart Rate: Relations to Age and Gender Over Nine Decades," J Am Coll Cardiol, Mar. 1, 1998, pp. 593-601, 9 pages.
Von Leupoldt et al., "Emotions in a Body Plethysmograph," Journal of Psychophysiology (2004), 18, pp. 170-176, 1 page. (Abstract provided).
Kallman et al., "Effect of Blank Time on Picture Recognition," The American Journal of Psychology, vol. 97, No. 3 (Autumn, 1984), pp. 399-406, 4 pages. (Abstract provided).
Larose, *Data Mining Methods and Models*, Department of Mathematical Sciences, Central Connecticut State University, www.dbeBooks.com—An Ebook Library,published by John Wiley & Sons, Inc., 2006, 340 pages.
Han et al., *Data Mining: Concepts and Techniques*, $2^{nd}$ Edition, Elsevier, 2006, 772 pages.
Liu et al., *Web Data Mining: Exploring Hyperlinks, Contents, and Usage Data*, Springer Science & Business Media, 2007, 532 pages.
Berry et al., *Data Mining Techniques: For Marketing, Sales, and Customer Support*, Wiley Publishing Inc., Jun. 1997, 464 pages.
Horovitz, "Watching Ads Is Real Science Research Companies Monitor Physiological Reactions To Commercials To Determine Their Effectiveness," Los Angeles Times, Sep. 1, 1991, 3 pages.
Sung et al., "Wearable feedback systems for rehabilitation," Journal of NeuroEngineering and Rehabilitation, 2005, 12 pages.
Jaffe, *Casting for Big Ideas*, Adweek Magazine Series, Book 8, 2003, 256 page.
Hall "A New Model for Measuring Advertising Effectiveness," J. Advertising Research, vol. 42(2) (Mar./Apr. 2002), 1 page. (Abstract provided).
Hall, "Advertising as a Factor of Production," ADMAP, Apr., 2003, pp. 20-23, 1 page. (Abstract provided).
Ranii, "Adding Science to Gut Check," The News & Observer, D3 (Apr. 6, 2005), 1 page. (Abstract provided).
McCraty et al., "Impact of a Workplace Stress Reduction Program on Blood Pressure and Emotional Health in Hypertensive Employees", the Journal of Alternative and Complementary Medicine, vol. 9, No. 3, 2003, pp. 355-369, Mary Ann Liebert, Inc., 15 pages.
United States Patent and Trademark Office, "Final Office Action," issued in connection with U.S. Appl. No. 12/263,331, on Apr. 1, 2016, 32 pages.

(56) References Cited

OTHER PUBLICATIONS

M. Corbetta et al., "Control of Goal-Directed and Stimulus-Driven Attention in the Brain," Nature Reviews Neuroscience, vol. 3, pp. 201-15 (Mar. 2002), 15 pages.
Becker, S. "A Study of Web Usability for Older Adults Seeking Online Health Resources," ACM Transactions on Computer-Human Interaction, vol. 11, No. 4, pp. 387-406 (Dec. 2004), 20 pages.
United States Patent and Trademark Office, "Notice of Allowance," issued in connection with U.S. Appl. No. 12/263,331, on Aug. 4, 2016, 46 pages.
Knutson et al., "Neural Predictors of Purchases," Neuron vol. 53 (Jan. 4, 2007), pp. 147-156, 10 pages.
Schaefer et al., "Neural Correlates of Culturally Familiar Brands of Car Manufacturers," NeuroImage, vol. 31 (2006), pp. 861-865, 5 pages.
Aharon et al., "Beautiful Faces Have Variable Reward Value: fMRI and Behavorial Evidence," Neuron, vol. 32 (2001), pp. 537-551, 15 pages.

\* cited by examiner

FIG.10 fun  cool  boring new confusing  interesting  dark mysterious  engaging  suspenseful beautiful  alien  stunning  intense  futuristic  entertaining
dumb  adventurous  over  smooth  vivid  fantasy
action-packed  quality  corny
adventure

FIG.16

SYSTEMS AND METHODS TO DETERMINE MEDIA EFFECTIVENESS

RELATED APPLICATIONS

This patent arises from a continuation of U.S. patent application Ser. No. 13/659,592, filed on Oct. 24, 2012, U.S. patent application Ser. No. 12/244,751, filed on Oct. 2, 2008, now U.S. Pat. No. 8,327,395, and U.S. patent application Ser. No. 12/244,752, filed on Oct. 2, 2008, now U.S. Pat. No. 8,332,883, which are hereby incorporated by reference in their entireties.

This patent claims the benefit of U.S. Patent Application Ser. No. 60/977,035, filed Oct. 2, 2007.

This patent claims the benefit of U.S. Patent Application Ser. No. 60/977,040, filed Oct. 2, 2007.

This patent claims the benefit of U.S. Patent Application Ser. No. 60/977,042, filed Oct. 2, 2007.

This patent claims the benefit of U.S. Patent Application Ser. No. 60/977,045, filed Oct. 2, 2007.

This patent claims the benefit of U.S. Patent Application Ser. No. 60/984,260, filed Oct. 31, 2007.

This patent claims the benefit of U.S. Patent Application Ser. No. 60/984,268, filed Oct. 31, 2007.

This patent claims the benefit of U.S. Patent Application Ser. No. 60/991,591, filed Nov. 30, 2007.

This patent is related to U.S. patent application Ser. No. 11/681,265, filed Mar. 2, 2007; U.S. patent application Ser. No. 11/804,517, filed May 17, 2007; U.S. patent application Ser. No. 11/779,814, filed Jul. 18, 2007; U.S. patent application Ser. No. 11/846,068, filed Aug. 28, 2007; U.S. patent application Ser. No. 11/959,399, filed Dec. 18, 2007; U.S. patent application Ser. No. 12/244,737, filed Oct. 2, 2008; U.S. patent application Ser. No. 12/244,748, filed Oct. 2, 2008; U.S. patent application Ser. No. 12/263,331, filed Oct. 31, 2008; U.S. patent application Ser. No. 12/263,350, filed Oct. 31, 2008; U.S. patent application Ser. No. 12/326,016, filed Dec. 1, 2008; and U.S. patent application Ser. No. 13/252,910, filed Oct. 4, 2011.

TECHNICAL FIELD

This disclosure relates to the field of analysis of physiological responses from viewers of media instances.

BACKGROUND

A key to creating a high performing media instance is to ensure that every event in the media elicits the desired responses from viewers. Here, the media instance can be but is not limited to, a video game, an advertisement clip, a movie, a computer application, a printed media (e.g., a magazine), a website, an online advertisement, a recorded video, a live performance of media, and other types of media.

Physiological data, which includes but is not limited to heart rate, brain waves, electroencephalogram (EEG) signals, blink rate, breathing, motion, muscle movement, galvanic skin response and any other response correlated with changes in emotion of a viewer of a media instance, can give a trace (e.g., a line drawn by a recording instrument) of the viewer's responses while he/she is watching the media instance. The physiological data can be measure by one or more physiological sensors, each of which can be but is not limited to, an electroencephalogram, electrocardiogram, an accelerometer, a blood oxygen sensor, a galvanometer, an electromyograph, skin temperature sensor, breathing sensor, eye tracking, pupil dilation sensing, and any other physiological sensor.

It is well established that physiological data in the human body of a viewer correlates with the viewer's change in emotions. Thus, from the measured "low level" physiological data, "high level" (e.g., easier to understand, intuitive to look at) physiological responses from the viewers of the media instance can be created. An effective media instance that connects with its audience/viewers is able to elicit the desired emotional response. Here, the high level physiological responses include, but are not limited to, liking (valence)—positive/negative responses to events in the media instance, intent to purchase or recall, emotional engagement in the media instance, thinking—amount of thoughts and/or immersion in the experience of the media instance, and adrenaline—anger, distraction, frustration, and other emotional experiences to events in the media instance, and tension and stress.

Advertisers, media producers, educators, scientists, engineers, doctors and other relevant parties have long desired to have greater access to collected reactions to their media products and records of responses through a day from their targets, customers, clients and pupils. These parties desire to understand the responses people have to their particular stimulus in order to tailor their information or media instances to better suit the needs of end users and/or to increase the effectiveness of the media instance created. Making the reactions to the media instances available remotely over the Web to these interested parties has potentially very large commercial and socially positive impacts. Consequently, allowing a user to remotely access and analyze the media instance and the physiological responses from numerous viewers to the media instance is desired.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference. Notwithstanding the prior sentence, U.S. patent application Ser. No. 12/244,737, filed Oct. 2, 2008; U.S. patent application Ser. No. 12/244,748, filed Oct. 2, 2008; U.S. patent application Ser. No. 12/263,331, filed Oct. 31, 2008; U.S. patent application Ser. No. 12/244,752, filed Oct. 2, 2008; U.S. patent application Ser. No. 12/263,350, filed Oct. 31, 2008; U.S. patent application Ser. No. 12/326,016, filed Dec. 1, 2008; and U.S. patent application Ser. No. 13/252,910, filed Oct. 4, 2011 are not incorporated by reference.

BRIEF DESCRIPTION OF THE DRAWINGS

FIG. 10 shows exemplary highlights and arrows representing trends in the physiological responses from the viewers as well as verbal explanation of such markings.

FIG. 16 shows an exemplary word cloud presenting key words and concepts from the viewers of the media instance.

DETAILED DESCRIPTION

Figure 1:
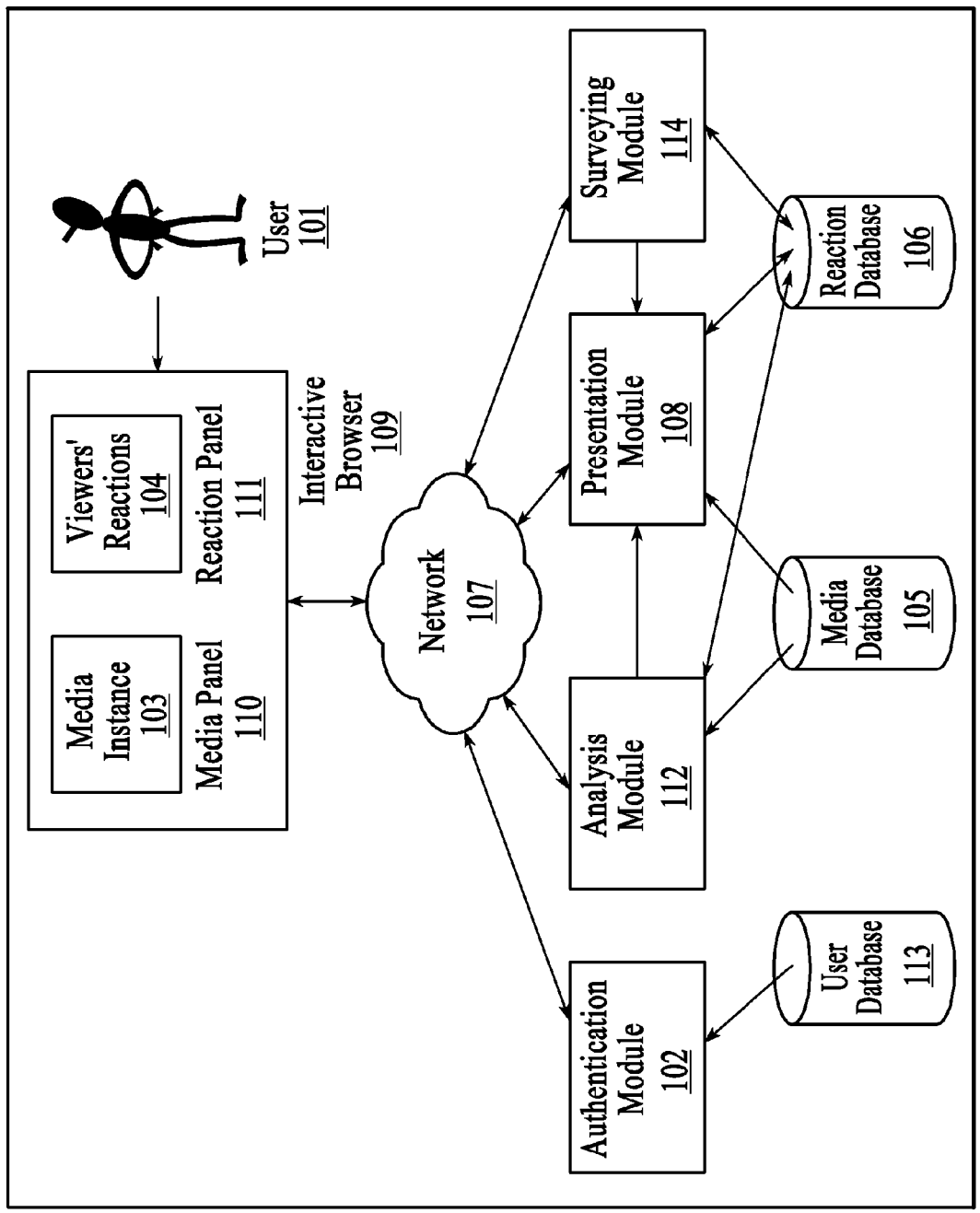
FIG. 1 is an illustration of an exemplary system to support remote access and analysis of media and reactions from viewers.

Examples disclosed herein enable remote and interactive access, navigation, and analysis of reactions from one or more viewers to a specific media instance. Here, the reactions include, but are not limited to, physiological responses, survey results, verbatim feedback, event-based metadata, and derived statistics for indicators of success and failure from the viewers. The reactions from the viewers are aggregated and stored in a database and are delivered to a user via a web-based graphical interface or application, such as a Web browser. Through the web-based graphical interface, the user is able to remotely access and navigate the specific media instance, together with one or more of: the aggregated physiological responses that have been synchronized with the media instance, the survey results, and the verbatim feedbacks related to the specific media instance. Instead of being presented with static data (such as a snapshot) of the viewers' reactions to the media instance, the user is now able to interactively divide, dissect, parse, and analysis the reactions in any way he/she prefer. The examples disclosed herein provide automation that enables those who are not experts in the field of physiological analysis to understand and use physiological data by enabling these non-experts to organize the data and organize and improve presentation or visualization of the data according to their specific needs. In this manner, the examples disclosed herein provide an automated process that enables non-experts to understand complex data, and to organize the complex data in such a way as to present conclusions as appropriate to the media instance.

In the following description, numerous specific details are introduced to provide a thorough understanding of, and enabling description for, example systems and methods. One skilled in the relevant art, however, will recognize that these examples can be practiced without one or more of the specific details, or with other components, systems, etc. In other instances, well-known structures or operations are not shown, or are not described in detail, to avoid obscuring aspects of the disclosed examples.

Having multiple reactions from the viewers (e.g., physiological responses, survey results, verbatim feedback, events tagged with metadata, etc.) available in one place and at a user's fingertips, along with the automated methods for aggregating the data provided herein, allows the user to view the reactions to hundreds of media instances in one sitting by navigating through them. For each of the media instances, the integration of multiple reactions provides the user with more information than the sum of each of the reactions to the media instance. For a non-limiting example, if one survey says that an ad is bad, that is just information; but if independent surveys, verbatim feedbacks and physiological data across multiple viewers say the same, the reactions to the media instance become more trustworthy. By combining this before a user sees it, the correct result is presented to the user.

FIG. 1 is an illustration of an example system to support automated remote access and analysis of media and reactions from viewers. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 1, an authentication module 102 is operable to authenticate identity of a user 101 requesting access to a media instance 103 together with one or more reactions 104 from a plurality of viewers of the media instance remotely over a network 107. Here, the media instance and its pertinent data can be stored in a media database 105, and the one or more reactions from the viewers can be stored in a reaction database 106, respectively. The network 107 can be, but is not limited to, one or more of the internet, intranet, wide area network (WAN), local area network (LAN), wireless network, Bluetooth, and mobile communication networks. Once the user is authenticated, a presentation module 108 is operable to retrieve and present the requested information (e.g., the media instance together with one or more reactions from the plurality of viewers) to the user via an interactive browser 109. The interactive browser 109 comprises at least two panels including a media panel 110, which is operable to present, play, and pause the media instance, and a response panel 111, which is operable to display the one or more reactions corresponding to the media instance, and provide the user with a plurality of features to interactively divide, dissect, parse, and analyze the reactions.

Figure 2:
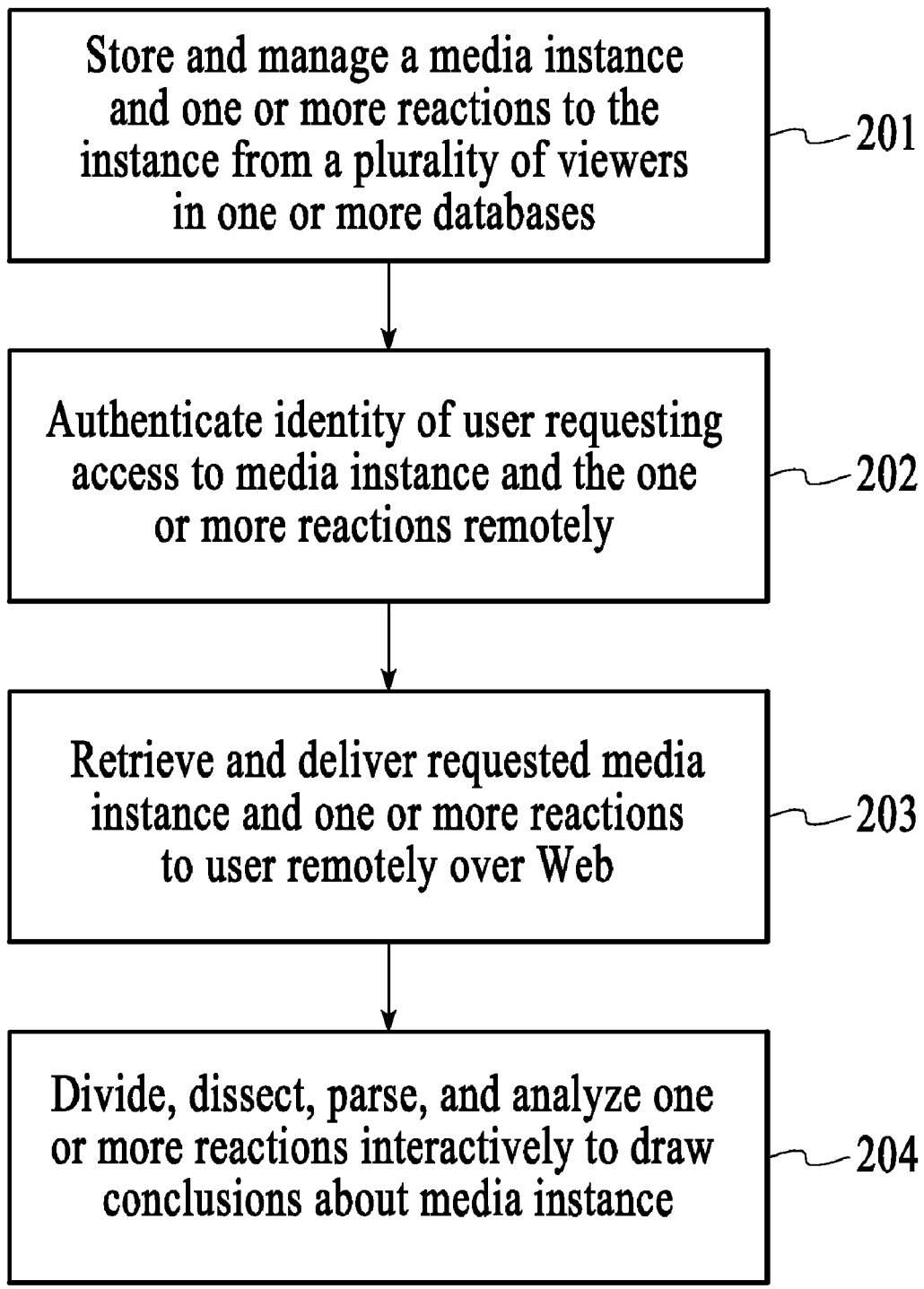
FIG. 2 is a flow chart illustrating an exemplary process to support remote access and analysis of media and reactions from viewers.

FIG. 2 is a flow chart illustrating an exemplary process to support remote access and analysis of media and reactions from viewers. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 2, a media instance and one or more reactions to the instance from a plurality of viewers are stored and managed in one or more databases at step 201. Data or information of the reactions to the media instance is obtained or gathered from each user via a sensor headset, one example of which is described in U.S. patent application Ser. No. 12/206,676, filed Sep. 8, 2008, U.S. patent application Ser. No. 11/804,517, filed May 17, 2007, and U.S. patent application Ser. No. 11/681,265, filed Mar. 2, 2007. At step 202, the identity of a user requesting access to the media instance and the one or more reactions remotely is authenticated. At step 203, the requested media instance and the one or more reactions are retrieved and delivered to the user remotely over a network (e.g., the Web). At step 204, the user may interactively aggregate, divide, dissect, parse, and analyze the one or more reactions to draw conclusions about the media instance.

In some examples, alternative forms of access to the one or more reactions from the viewers other than over the network may be adopted. For non-limiting examples, the reactions can be made available to the user on a local server on a computer or on a recordable media such as a DVD disc with all the information on the media.

In some examples, with reference to FIG. 1, an optional analysis module 112 is operable to perform in-depth analysis on the viewers' reactions to a media instance as well as the media instance itself (e.g., dissecting the media instance into multiple scenes/events/sections). Such analysis provides the user with information on how the media instance created by the user is perceived by the viewers. In addition, the analysis module is also operable to categorize viewers' reactions into the plurality of categories.

In some examples, user database 113 stores information of users who are allowed to access the media instances and the reactions from the viewers, and the specific media instances and the reactions each user is allowed to access. The access module 106 may add or remove a user for access, and limit or expand the list of media instances and/or reactions the user can access and/or the analysis features the user can use by checking the user's login name and password. Such authorization/limitation on a user's access can be determined based upon who the user is, e.g., different amounts of information for different types of users. For a non-limiting example, Company ABC can have access to certain ads and survey results of viewers' reactions to the ads, which Company XYZ cannot or have only limited access to.

Figure 3:
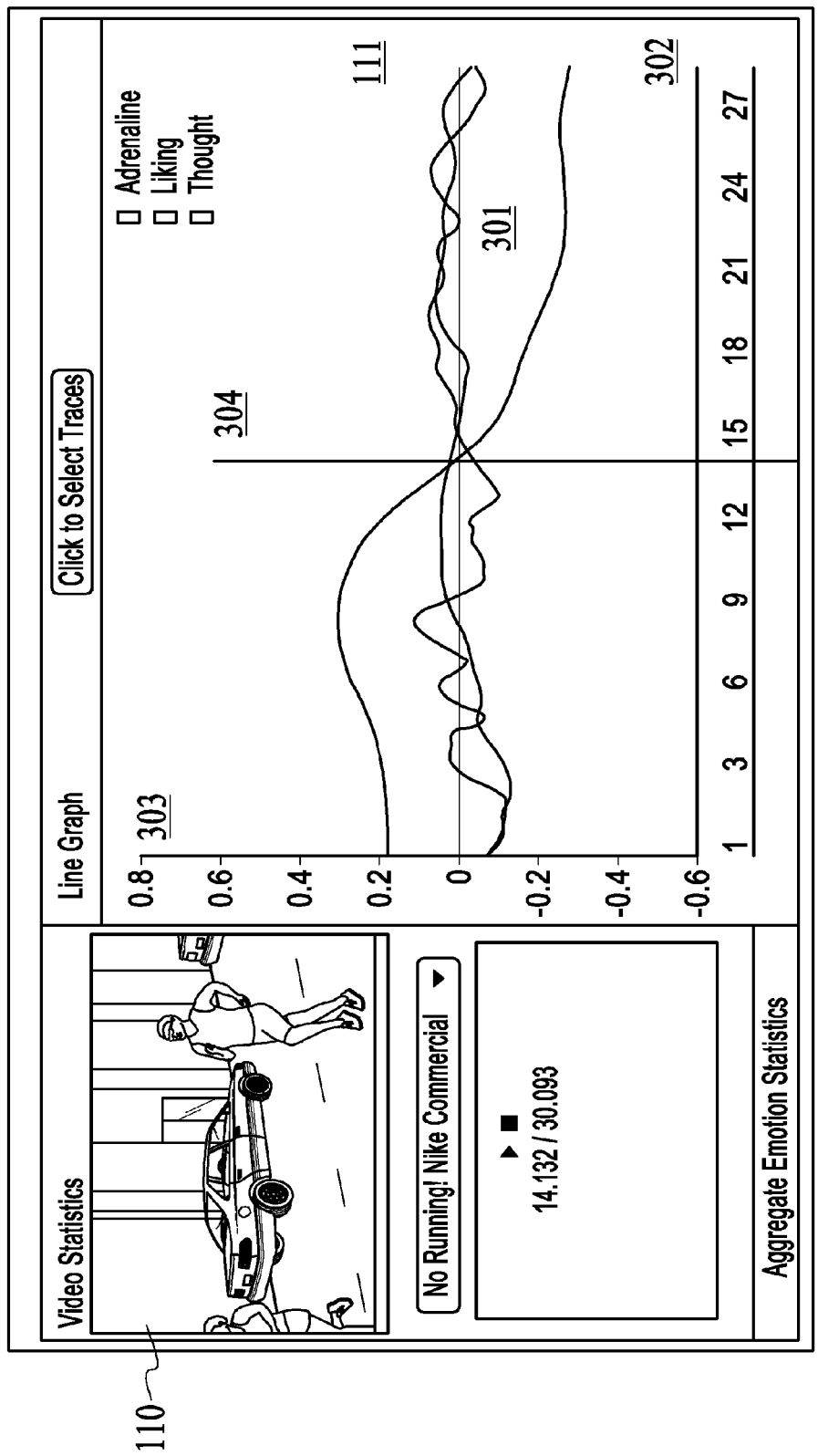
FIG. 3 shows one or more exemplary physiological responses aggregated from the viewers and presented in the response panel of the interactive browser.

In some examples, one or more physiological responses aggregated from the viewers can be presented in the response panel 111 as lines or traces 301 in a two-dimensional graph or plot as shown in FIG. 3. Horizontal axis 302 of the graph represents time, and vertical axis 303 of the graph represents the amplitude (intensity) of the one or more physiological responses. Here, the one or more physiological responses are aggregated over the viewers via one or more of: max, min, average, deviation, or a higher ordered approximation of the intensity of the physiological responses from the viewers. The responses are synchronized with the media instance at each and every moment over the entire duration of the media instance, allowing the user to identify the second-by second changes in viewers' emotions and their causes. A cutting line 304 marks the physiological responses from the viewers corresponding to the current scene (event, section, or moment in time) of the media instance. The cutting line moves in coordination with the media instance being played.

In some examples, change (trend) in amplitude of the aggregated responses is also a good measure of the quality of the media instance. If the media instance is able to change viewers emotions up and down in a strong manner (for a non-limiting example, mathematical deviation of the response is large), such strong change in amplitude corresponds to a good media instance that puts the viewers into different emotional states. In contrast, a poor performing media instance does not put the viewers into different emotional states. The amplitudes and the trend of the amplitudes of the responses are good measures of the quality of the media instance. Such information can be used by media designers to identify if the media instance is eliciting the desired response and which key events/scenes/sections of the media instance need to be changed in order to match the desired response. A good media instance should contain multiple moments/scenes/events that are intense and produce positive amplitude of response across viewers. A media instance that failed to create such responses may not achieve what the creators of the media instance have intended.

In some examples, other than providing a second by second view for the user to see how specific events in the media instance affect the viewers' emotions, the aggregated responses collected and calculated can also be used for the compilation of aggregate statistics, which are useful in ranking the overall affect of the media instance. Such statistics include but are not limited to Average Liking and Heart Rate Deviation.

Figure 4:
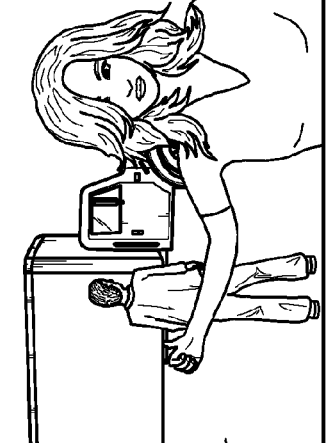
FIG. 4 shows exemplary verbatim comments and feedbacks collected from the viewers and presented in the response panel of the interactive browser.

In some examples, the viewers of the media instance are free to write comments (e.g., what they like, what they dislike, etc.) on the media instance, and the verbatim (free flowing text) comments or feedbacks 401 from the viewers can be recorded and presented in a response panel 111 as shown in FIG. 4. Such comments can be prompted, collected, and recorded from the viewers while they are watching the specific media instance and the most informative ones are put together and presented to the user. The user may then analyze, and digest keywords in the comments to obtain a more complete picture of the viewers' reactions. In addition, the user can search for specific keywords he/she is interested in about the media instance, and view only those comments containing the specified keywords.

In some examples, the viewers' comments about the media instance can be characterized as positive or negative in a plurality of categories/topics/aspects related to the product, wherein such categories include but are not limited to, product, event, logo, song, spokesperson, jokes, narrative, key events, storyline. These categories may not be predetermined, but instead be extracted from the analysis of their comments.

Figure 5:
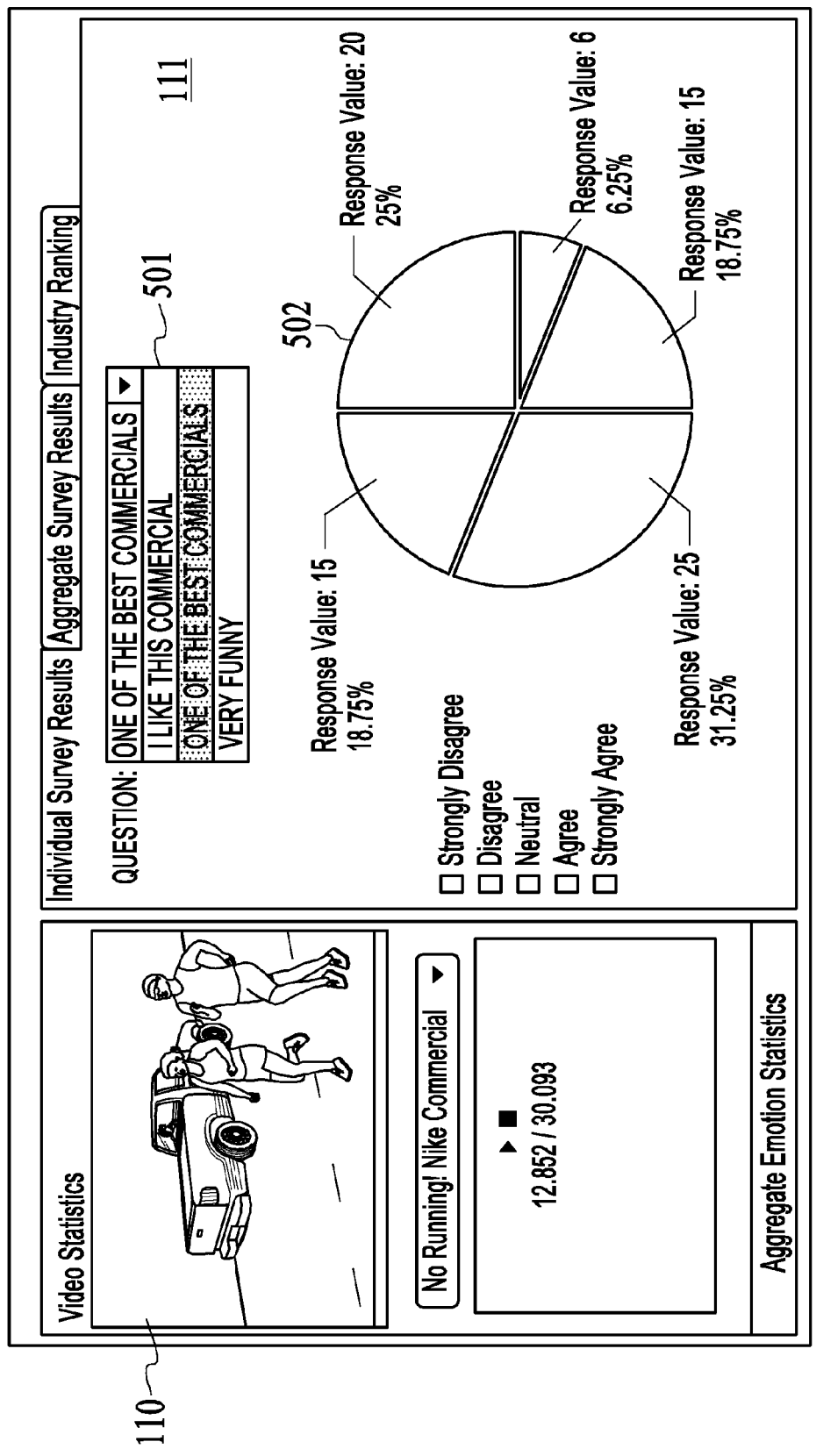
FIG. 5 shows exemplary answers to one or more survey questions collected from the viewers and presented as a pie chart in the response panel of the interactive browser.
Figure 6:
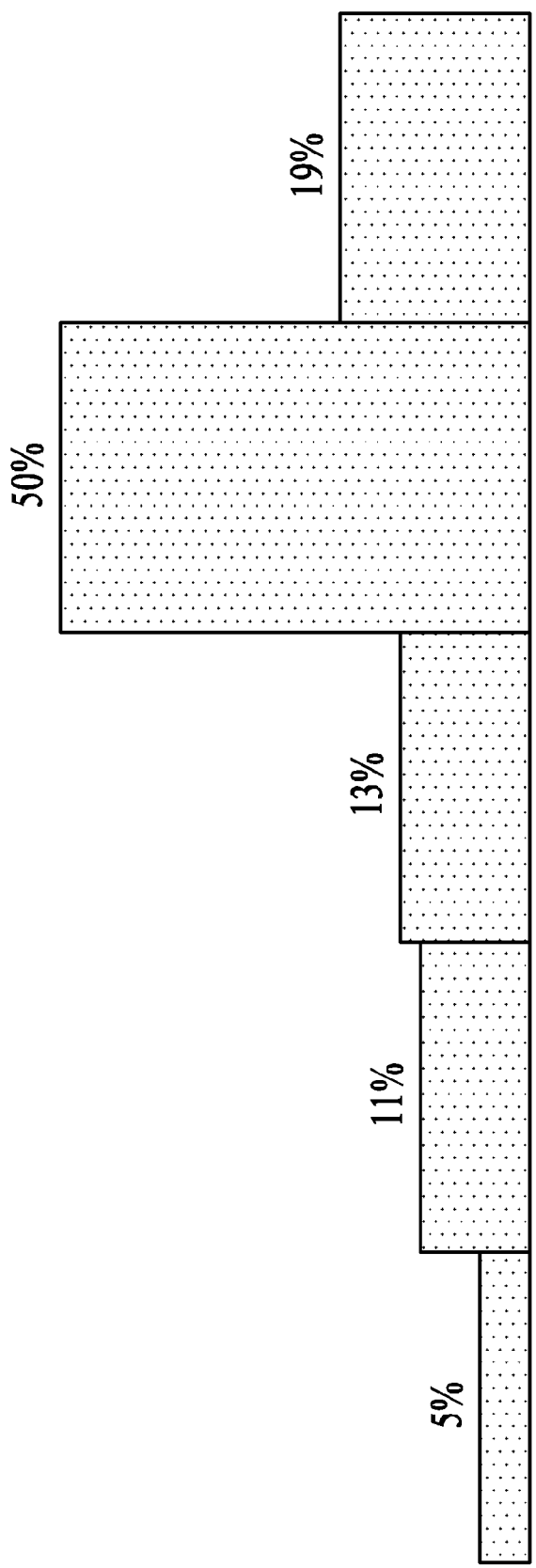
FIG. 6 shows exemplary answers to one or more survey questions collected from the viewers and presented as a histogram

In some examples, answers to one or more survey questions 501 aggregated from the viewers can be rendered graphically, for example, by being presented in the response panel 111 in a graphical format 502 as shown in FIG. 5 Alternatively, FIG. 6 is an exemplary histogram displaying the response distribution of viewers asked to rate an advertisement on a scale of 1-5. Here, the graphical format can be but is not limited to, a bar graph, a pie chart (e.g., as shown in FIG. 5), a histogram (e.g., as shown in FIG. 6), or any other suitable graph type.

In some examples, the survey questions can be posed or presented to the viewers while they are watching the specific media instance and their answers to the questions are collected, recorded, summed up by pre-defined categories via a surveying module 114. Once the survey results are made available to the user (creator of the media instance), the user may pick any of the questions, and be automatically presented with survey results corresponding to the question visually to the user. The user may then view and analyze how viewers respond to specific questions to obtain a more complete picture of the viewers' reactions.

Figure 7:
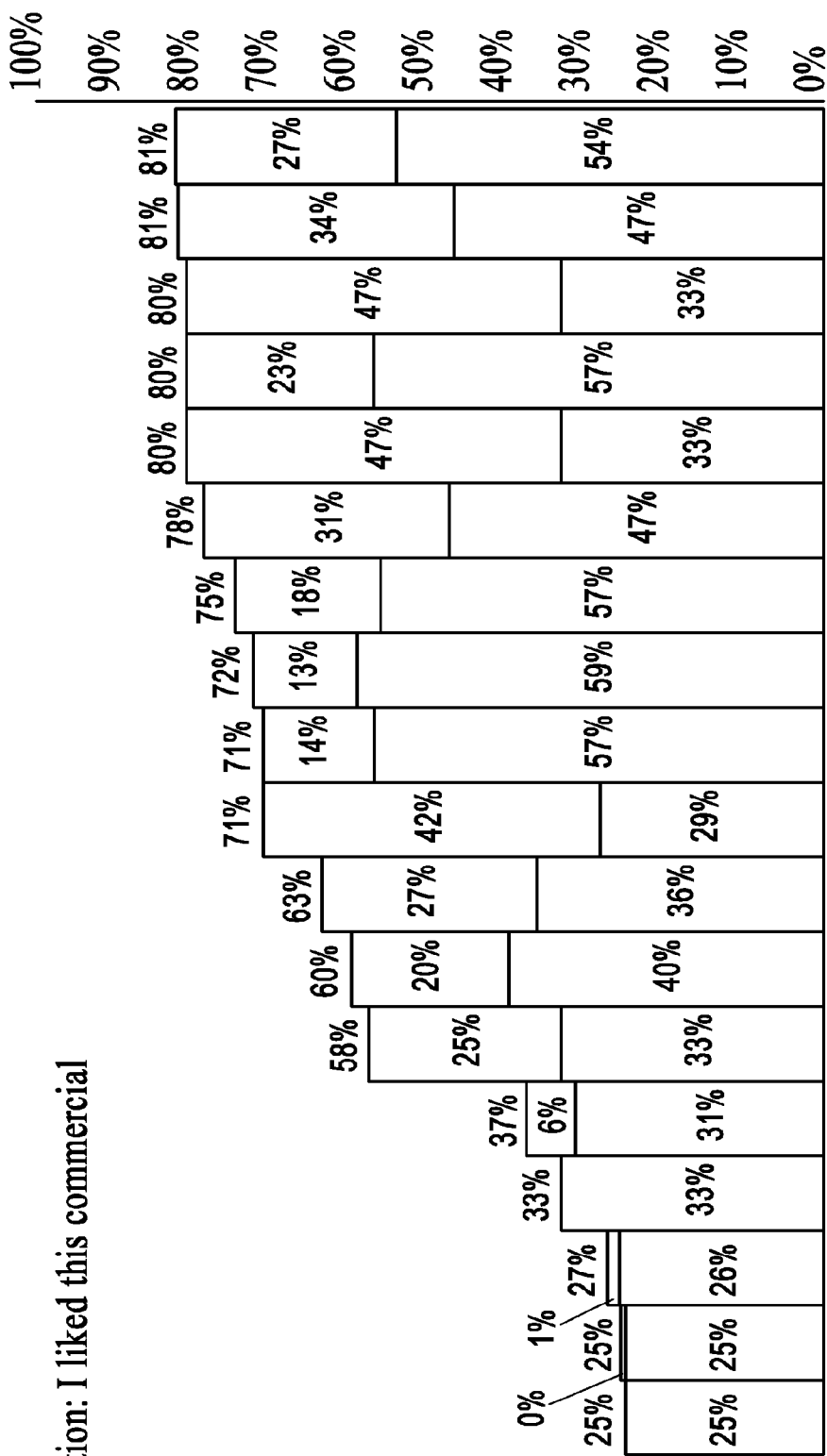
FIG. 7 shows an exemplary graph displaying the percentages of viewers who "liked" or "really liked" a set of advertisements.

In some examples, many different facets of the one or more reactions from the viewers described above can be blended into a few simple metrics that the user can use to see how it is currently positioned against the rest of their industry. For the user, knowing where it ranks in its industry in comparison to its competition is often the first step in getting to where it wants to be. For a non-limiting example, in addition to the individual survey results of a specific media instance, the surveying module may also provide the user with a comparison of survey results and statistics to multiple media instances. This automation allows the user not only to see the feedback that the viewers provided with respect to the specific media instance, but also to evaluate how the specific media instance compares to other media instances designed by the same user or its competitors. FIG. 7 shows an exemplary graph displaying the percentages of viewers who "liked" or "really liked" a set of advertisements, which helps to determine if a new ad is in the top quartile with respect to other ads.

Some examples disclosed herein provide a user not only with tools for accessing and obtaining a maximum amount of information out of reactions from a plurality of viewers to a specific media instance, but also with actionable insights on what changes the user can make to improve the media instance based on in-depth analysis of the viewers' reactions. Such analysis requires expert knowledge on the viewers' physiological behavior and large amounts of analysis time, which the user may not possess. Here, the reactions include but are not limited to, physiological responses, survey results, and verbatim feedbacks from the viewers, to name a few. The reactions from the viewers are aggregated and stored in a database and presented to the user via a graphical interface, as described above. In some examples, predefined methods for extracting information from the reactions and presenting that information are provided so that the user is not required to be an expert in physiological data analysis to reach and understand conclusions supported by the information. Making in-depth analysis of reactions to media instances and actionable insights available to a user enables a user who is not an expert in analyzing physiological data to obtain critical information that can have significant commercial and socially positive impacts.

Figure 8:
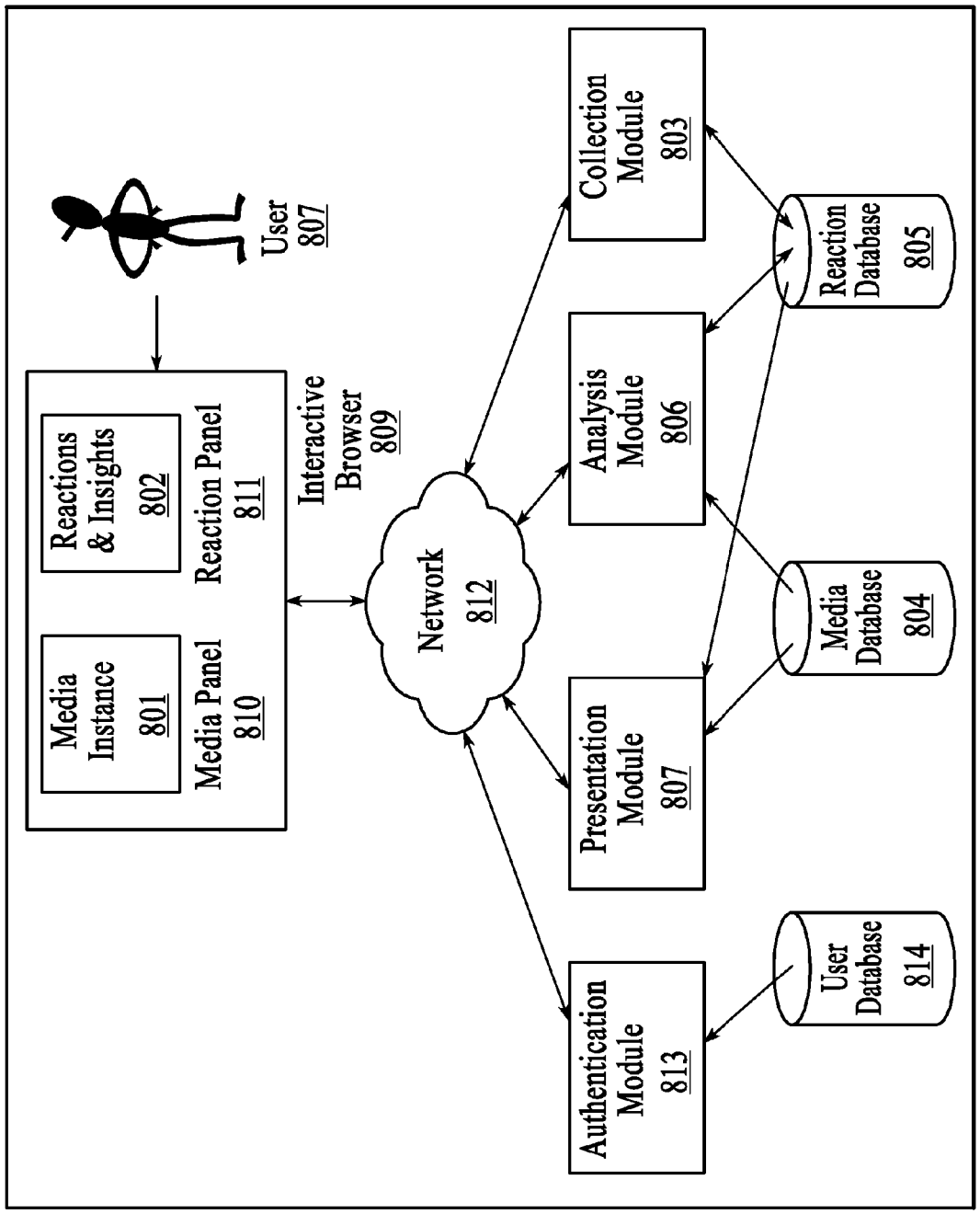
FIG. 8 is an illustration of an exemplary system to support providing actionable insights based on in-depth analysis of reactions from viewers.

FIG. 8 is an illustration of an exemplary system to support providing actionable insights based on in-depth analysis of reactions from viewers. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 8, a collection module 803 is operable to collect, record, store and manage one or more reactions 802 from a plurality of viewers of a media instance 801. The viewers from whom reactions 802 are collected can be in the same physical location or different physical locations. Additionally, the viewers can be viewing the media instance and the reactions collected at the same time, or at different times (e.g., viewer 1 is viewing the media instance at 9 AM while viewer 2 is viewing the media instance at 3 PM). Data or information of the reactions to the media instance is obtained or gathered from each user via a sensor headset. In some examples, the sensor headset integrates sensors into a housing which can be placed on a human head for measurement of physiological data. The device includes at least one sensor and can include a reference electrode connected to the housing. A processor coupled to the sensor and the reference electrode receives signals that represent electrical activity in tissue of a user. The processor generates an output signal including data of a difference between an energy level in each of a first and second frequency band of the signals. The difference between energy levels is proportional to release level present time emotional state of the user. The headset includes a wireless transmitter that transmits the output signal to a remote device. The headset therefore processes the physiological data to create the output signal that correspond to a person's mental and emotional state (reactions or reaction data). An example of a sensor headset is described in U.S. patent application Ser. Nos. 12/206,676, filed Sep. 8, 2008, 11/804,517, filed May 17, 2007, and 11/681,265, filed Mar. 2, 2007.

The media instance and its pertinent data can be stored in a media database 804, and the one or more reactions from the viewers can be stored in a reaction database 805, respectively. An analysis module 806 performs in-depth analysis on the viewers' reactions and provides actionable insights on the viewers' reactions to a user 807 so that the user can draw its own conclusion on how the media instance can/should be improved. A presentation module 808 is operable to retrieve and present the media instance 801 together with the one or more reactions 802 from the viewers of the media instance via an interactive browser 809. Here, the interactive browser includes at least two panels—a media panel 810, operable to present, play, and pause the media instance, and a reaction panel 811, operable to display the one or more reactions corresponding to the media instance as well as the key insights provided by the analysis module 806.

Figure 9:
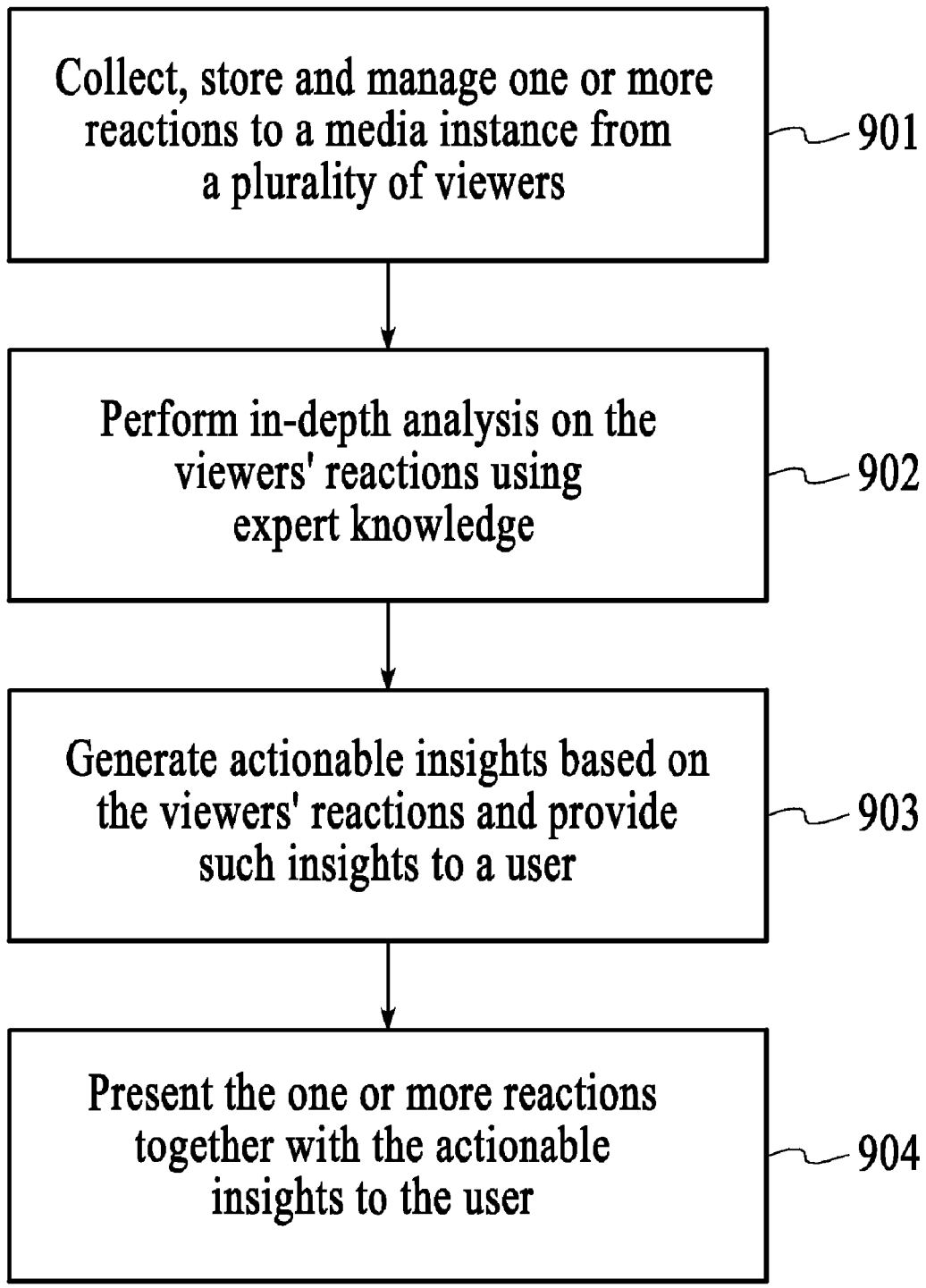
FIG. 9 is a flow chart illustrating an exemplary process to support providing actionable insights based on in-depth analysis of reactions from viewers.

FIG. 9 is a flow chart illustrating an exemplary automatic process to support providing actionable insights based on in-depth analysis of reactions from viewers. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 9, one or more reactions to a media instance from a plurality of viewers are collected, stored and managed in one or more databases at step 901. At step 902, in-depth analysis is performed on the viewers' reactions using expert knowledge, and actionable insights are generated based on the viewers' reactions and provided to a user at step 903 so that the user can draw its own conclusion on the media instance can/should be improved. At step 904, the one or more reactions can be presented to the user together with the actionable insights to enable the user to draw its own conclusions about the media instance. The configuration used to present the reactions and actionable insights can be saved and tagged with corresponding information, allowing it to be recalled and used for similar analysis in the future.

In some examples, the analysis module is operable to provide insights or present data based in-depth analysis on the viewers' reactions to the media instance on at least one question. An example question is whether the media instance performs most effectively across all demographic groups or especially on a specific demographic group, e.g., older women? Another example question is whether certain elements of the media instance, such as loud noises, were very effective at engaging viewers in a positive, challenging way? Yet another example question is whether thought provoking elements in the media instance were much more engaging to viewers than product shots? Also, an example question includes whether certain characters, such as lead female characters, appearing in the media instance were effective for male viewers and/or across target audiences in the female demographic? Still another example question includes whether physiological responses to the media instance from the viewers were consistent with viewers identifying or associating positively with the characters in the media instance? A further question is whether the media instance was universal—performed well at connecting across gender, age, and income boundaries, or highly polarizing?

The analysis module therefore automates the analysis through use of one or more questions, as described above. The questions provide a context for analyzing and presenting the data or information received from viewers in response to the media instance. The analysis module is configured, using the received data, to answer some number of questions, where answers to the questions provide or correspond to the collected data. When a user desires results from the data for a particular media instance, the user selects a question to which they desire an answer for the media instance. In response to the question selection, the results of the analysis are presented in the form of an answer to the question, where the answer is derived or generated using the data collected and corresponding to the media instance. The results of the analysis can be presented using textual and/or graphical outputs or presentations. The results of the analysis can also be generated and presented using previous knowledge of how to represent the data to answer the question, the previous knowledge coming from similar data analyzed in the past. Furthermore, presentation of data of the media instance can be modified by the user through user or generation of other questions.

The analysis module performs the operations described above in conjunction with the presentation module, where the presentation module includes numerous different renderings for data. In operation, a rendering is specified or selected for a portion of data of a media instance, and the rendering is then tagged with one or more questions that apply to the data. This architecture allows users to modify how data is represented using a set of tools. The system remembers or stores information of how data was represented and the question or question type that was being answered. This information of prior system configurations allows the system, at a subsequent time, to self-configure to answer the same or similar questions for the same media instance or for different media instances. Users thus continually improve the ability of the system to answer questions and improve the quality of data provided in the answers.

Figure 10:
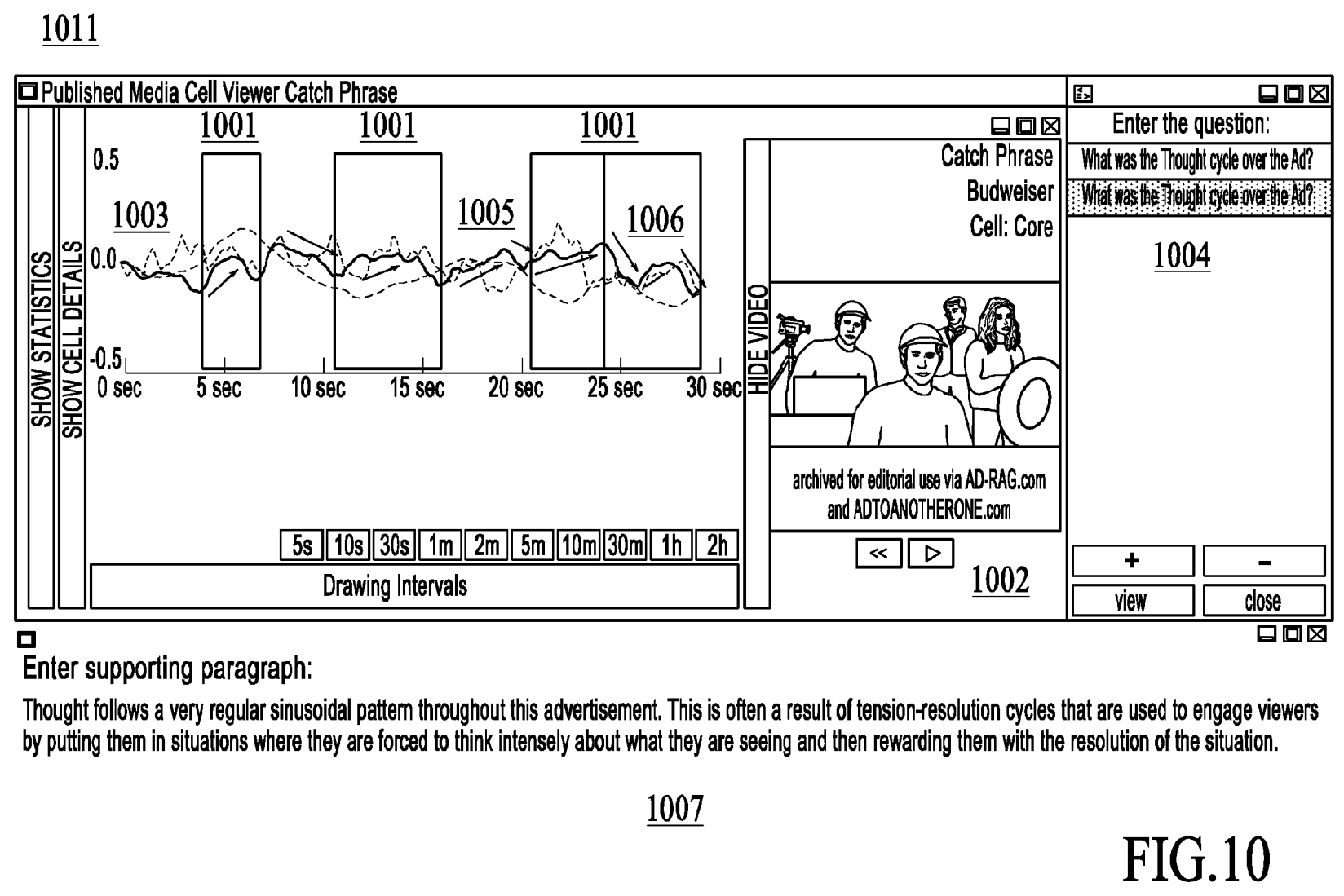

In some examples, the presentation module is operable to enable the user to pick a certain section 1001 of the reactions to the media instance 1002, such as the physiological responses 1003 from the viewers shown in the reaction panel 1011 via, for a non-limiting example, "shading", as shown in FIG. 10. The analysis module 1006 may then perform the analysis requested on the shaded section of media instance and/or physiological responses automatically to illustrate the responses in a way that a lay person can take advantage of expert knowledge in parsing the viewers' reaction. The analyzed results can then be presented to the user in real time and can be shared with other people.

In some examples, the analysis module is operable to analyze the shaded section of the media instance and/or responses by being preprogrammed either by an analyst or the user themselves. Usually, a user is most often interested in a certain number of attributes of the viewers' responses. The analysis module provides the user with insights, conclusions, and findings that they can review from the bottom up. Although the analysis result provides inside and in-depth analysis of the data as well as various possible interpretations of the shaded section of the media instance, which often leaves a conclusion evident, such analysis, however, is no substitute for reaching conclusion by the user. Instead the user is left to draw his/her own conclusion about the section based on the analysis provided.

In some examples, a user may pick a section and choose one of the questions/tasks/requests 1004 that he/she is interested in from a prepared list. The prepared list of questions may include but is not limited to any number of questions. Some example questions follow along with a response evoked in the analysis module.

An example question is "Where were there intense responses to the media instance?" In response the analysis module may calculate the intensity of the responses automatically by looking for high coherence areas of responses.

Another example question is "Does the media instance end on a happy note?" or "Does the audience think the event (e.g., joke) is funny?" In response the analysis module may check if the physiological data shows that viewer acceptance or approval is higher in the end than at the beginning of the media instance.

Yet another example question is "Where do people engage in the spot?" In response to this question the analysis module may check if there is a coherent change in viewers' emotions.

Still another example question is "What is the response to the brand moment?" In response the analysis module may check if thought goes up, but acceptance or approval goes down during the shaded section of the media.

An additional example question is "Which audience does the product introduction work on best?" In response the analysis module analyzes the responses from various segments of the viewers, which include but are not limited to, males, females, gamers, republicans, engagement relative to an industry, etc.

In some examples, the presentation module (FIG. 8, 807) is operable to present the analysis results in response to the questions raised together with the viewers' reactions to the user graphically on the interactive browser. For non-limiting examples, line highlights 1005 and arrows 1006 representing trends in the physiological responses from the viewers can be utilized as shown in FIG. 10, where highlights mark one or more specific physiological responses (e.g., thought in FIG. 10) to be analyzed and the up/down arrows indicate rise/fall in the corresponding responses. In addition, other graphic markings can also be used, which can be but are not limited to, text boxes, viewing data from multiple groups at once (comparing men to women) and any graphic tools that are commonly used to mark anything important. For another non-limiting example, a star, dot and/or other graphic element may be used to mark the point where there is the first coherent change and a circle may be used to mark the one with the strongest response.

In some examples, verbal explanation 1007 of the analysis results in response to the questions raised can be provided to the user together with graphical markings shown in FIG. 10. Such verbal explanation describes the graphical markings (e.g., why an arrow rises, details about the arrow, etc.). For the non-limiting example of an advertisement video clip shown in FIG. 10, verbal explanation 1007 states that "Thought follows a very regular sinusoidal pattern throughout this advertisement. This is often a result of tension-resolution cycles that are used to engage viewers by putting them in situations where they are forced to think intensely about what they are seeing and then rewarding them with the resolution of the situation." For another non-limiting example of a joke about a man hit by a thrown rock, the verbal explanation may resemble something like: "The falling of the man after being hit by a rock creates the initial coherent, positive response in liking. This shows that the actual rock throw is not funny, but the arc that the person's body takes is. After the body hits the ground, the response reverts to neutral and there are no further changes in emotions during this section."

In some examples, with reference to FIG. 8, an optional authentication module 813 is operable to authenticate identity of the user requesting access to the media instance and the verbatim reactions remotely over a network 812. Here, the network can be but is not limited to, internet, intranet, wide area network (WAN), local area network (LAN), wireless network, Bluetooth, and mobile communication network.

In some examples, optional user database 814 stores information of users who are allowed to access the media instances and the verbatim reactions from the viewers, and the specific media instances and the reactions each user is allowed to access. The access module 810 may add or remove a user for access, and limit or expand the list of media instances and/or reactions the user can access and/or the analysis features the user can use by checking the user's login name and password. Such authorization/limitation on a user's access can be determined to based upon who the user is, e.g., different amounts of information for different types of users. For a non-limiting example, Company ABC can have access to certain ads and feedbacks from viewers' reactions to the ads, to which Company XYZ cannot have access or can have only limited access.

In some examples, a specific media instance is synchronized with physiological responses to the media instance from a plurality of viewers continuously over the entire time duration of the media instance. Once the media instance and the physiological responses are synchronized, an interactive browser enables a user to navigate through the media instance (or the physiological responses) in one panel while presenting the corresponding physiological responses (or the section of the media instance) at the same point in time in another panel.

The interactive browser allows the user to select a section/scene from the media instance, correlate, present, and compare the viewers' physiological responses to the particular section. Alternatively, the user may monitor the viewers' physiological responses continuously as the media instance is being displayed. Being able to see the continuous (instead of static snapshot of) changes in physiological responses and the media instance side by side and compare aggregated physiological responses from the viewers to a specific event of the media instance in an interactive way enables the user to obtain better understanding of the true reaction from the viewers to whatever stimuli being presented to them.

Figure 11:
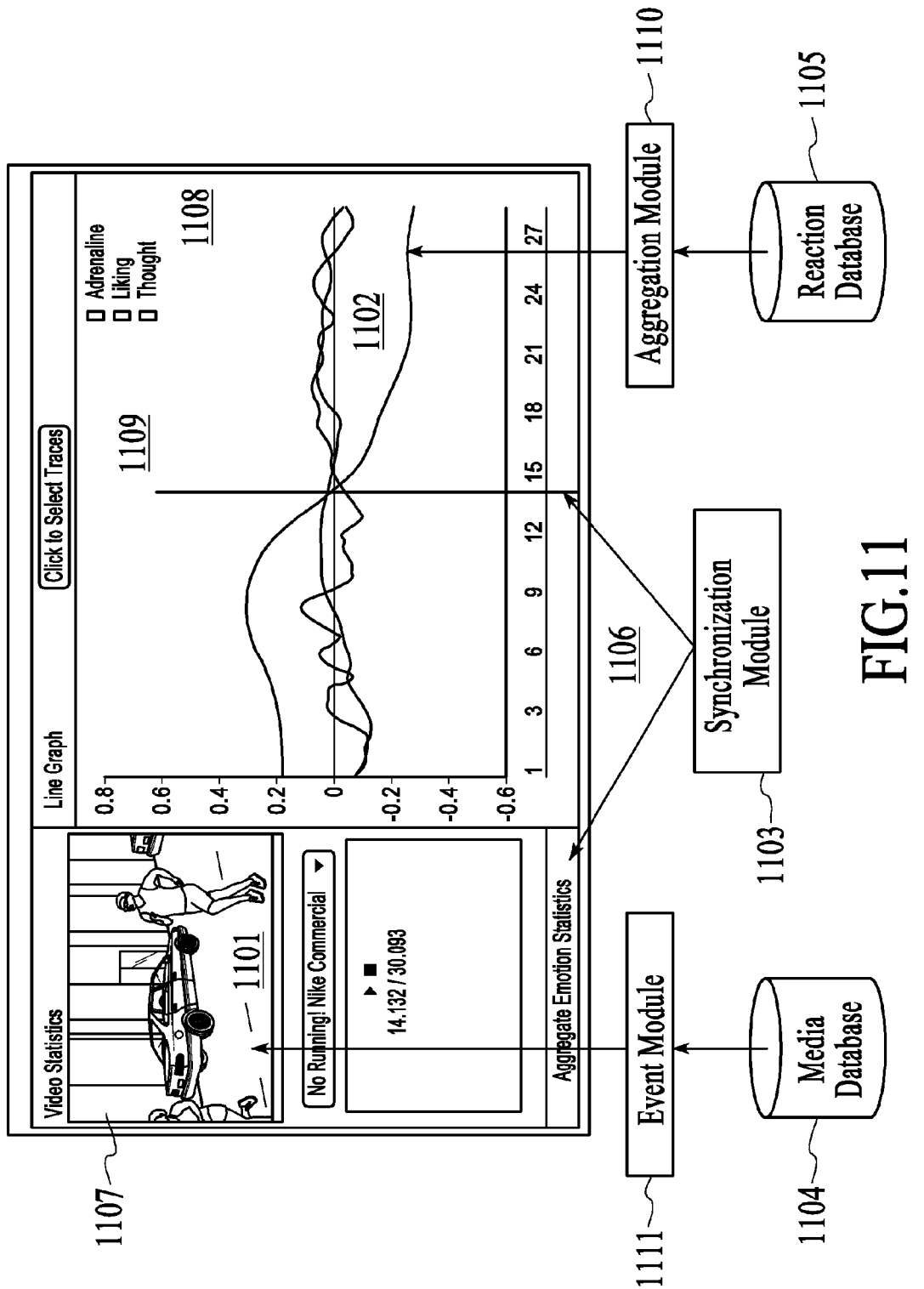
FIG. 11 is an illustration of an exemplary system to support synchronization of media with physiological responses from viewers.

FIG. 11 is an illustration of an exemplary system to support synchronization of media with physiological responses from viewers of the media. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 11, a synchronization module 1103 is operable to synchronize and correlate a media instance 1101 with one or more physiological responses 1102 aggregated from one or more viewers of the media instance continuously at each and every moment over the entire duration of the media instance. Here, the media instance and its pertinent data can be stored in a media database 1104, and the one or more physiological responses aggregated from the viewers can be stored in a reaction database 1105, respectively. An interactive browser 1106 comprises at least two panels including a media panel 1107, which is operable to present, play, and pause the media instance, and a reaction panel 1108, which is operable to display and compare the one or more physiological responses (e.g., Adrenaline, Liking, and Thought) corresponding to the media instance as lines (traces) in a two-dimensional line graph. A horizontal axis of the graph represents time, and a vertical axis represents the amplitude (intensity) of the one or more physiological responses. A cutting line 1109 marks the physiological responses from the viewers to the current scene (event, section, or moment in time) of the media instance, wherein the cutting line can be chosen by the user and move in coordination with the media instance being played. The interactive browser enables the user to select an event/section/scene/moment from the media instance presented in the media panel 1107 and correlate, present, and compare the viewers' physiological responses to the particular section in the reaction panel 1108. Conversely, interactive browser also enables the user to select the cutting line 1109 of physiological responses from the viewers in the reaction panel 1108 at any specific moment, and the corresponding media section or scene can be identified and presented in the media panel 1107.

In some examples, the synchronization module 1103 synchronizes and correlates a media instance 1101 with one or more physiological responses 1102 aggregated from a plurality of viewers of the media instance by synchronizing each event of the media. The physiological response data of a person includes but is not limited to heart rate, brain waves, electroencephalogram (EEG) signals, blink rate, breathing, motion, muscle movement, galvanic skin response, skin temperature, and any other physiological response of the person. The physiological response data corresponding to each event or point in time is then retrieved from the media database 1104. The data is offset to account for cognitive delays in the human brain corresponding to the signal collected (e.g., the cognitive delay of the brain associated with human vision is different than the cognitive delay associated with auditory information) and processing delays of the system, and then synchronized with the media instance 1101. Optionally, an additional offset may be applied to the physiological response data 1102 of each individual to account for time zone differences between the viewer and reaction database 1105.

Figure 12:
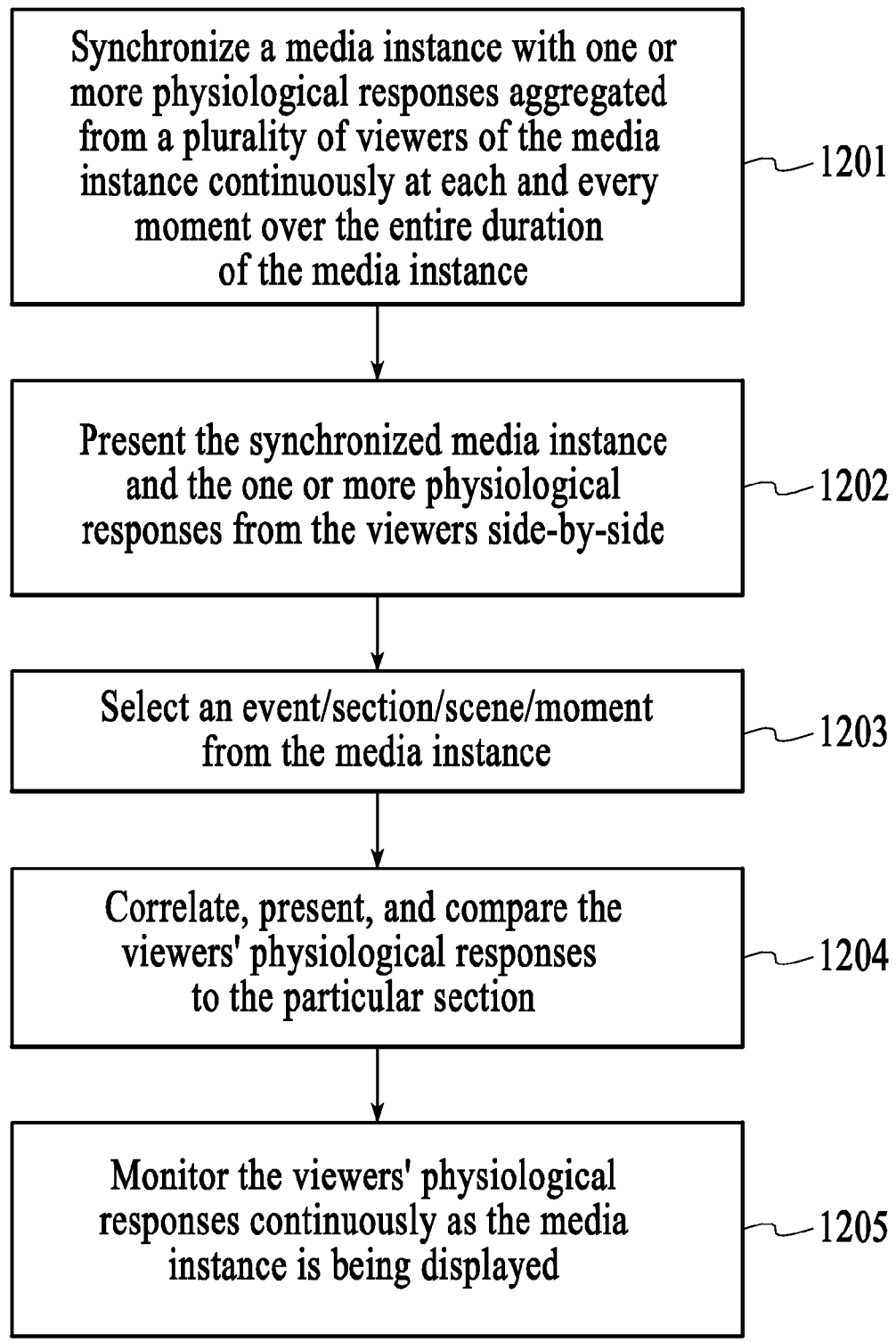
FIG. 12 is a flow chart illustrating an exemplary process to support synchronization of media with physiological responses from viewers.

FIG. 12 is a flow chart illustrating an exemplary process to support synchronization of media with physiological responses from viewers of the media. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 12, a media instance is synchronized with one or more physiological responses aggregated from a plurality of viewers of the media instance continuously at each and every moment over the entire duration of the media instance at step 1201. At step 1202, the synchronized media instance and the one or more physiological responses from the viewers are presented side-by-side. An event/section/scene/moment from the media instance can be selected at step 1203, and the viewers' physiological responses to the particular section can be correlated, presented, and compared at step 1204. Alternatively, the viewers' physiological responses can be monitored continuously as the media instance is being displayed at step 1205.

In some examples, with reference to FIG. 11, an aggregation module 1110 is operable to retrieve from the reaction database 1105 and aggregate the physiological responses to the media instance across the plurality of viewers and present each of the aggregated responses as a function over the duration of the media instance. The aggregated responses to the media instance can be calculated via one or more of: max, min, average, deviation, or a higher ordered approximation of the intensity of the physiological responses from the viewers.

In some examples, change (trend) in amplitude of the aggregated responses is a good measure of the quality of the media instance. If the media instance is able to change viewers emotions up and down in a strong manner (for a non-limiting example, mathematical deviation of the response is large), such strong change in amplitude corresponds to a good media instance that puts the viewers into different emotional states. In contrast, a poor performing media instance does not put the viewers into different emotional states. Such information can be used by media designers to identify if the media instance is eliciting the desired response and which key events/scenes/sections of the media instance need to be changed in order to match the desired response. A good media instance should contain multiple moments/scenes/events that are intense and produce positive amplitude of response across viewers. A media instance failed to create such responses may not achieve what the creators of the media instance have intended.

In some examples, the media instance can be divided up into instances of key moments/events/scenes/segments/sections in the profile, wherein such key events can be identified and/tagged according to the type of the media instance. In the case of video games, such key events include but are not limited to, elements of a video game such as levels, cut scenes, major fights, battles, conversations, etc. In the case of Web sites, such key events include but are not limited to, progression of Web pages, key parts of a Web page, advertisements shown, content, textual content, video, animations, etc. In the case of an interactive media/movie/ads, such key events can be but are not limited to, chapters, scenes, scene types, character actions, events (for non-limiting examples, car chases, explosions, kisses, deaths, jokes) and key characters in the movie.

In some examples, an event module 1111 can be used to quickly identify a numbers of moments/events/scenes/segments/sections in the media instance retrieved from the media database 1104 and then automatically calculate the length of each event. The event module may enable each user, or a trained administrator, to identify and tag the important events in the media instance so that, once the "location" (current event) in the media instance (relative to other pertinent events in the media instance) is selected by the user, the selected event may be better correlated with the aggregated responses from the viewers.

In some examples, the events in the media instance can be identified, automatically if possible, through one or more applications that parse user actions in an environment (e.g., virtual environment, real environment, online environment, etc.) either before the viewer's interaction with the media instance in the case of non-interactive media such as a movie, or afterwards by reviewing the viewer's interaction with the media instance through recorded video, a log of actions or other means. In video games, web sites and other electronic interactive media instance, the program that administers the media can create this log and thus automate the process.

An example enables graphical presentation and analysis of verbatim comments and feedbacks from a plurality of viewers to a specific media instance. These verbatim comments are first collected from the viewers and stored in a database before being analyzed and categorized into various categories. Once categorized, the comments can then be presented to a user in various graphical formats, allowing the user to obtain an intuitive visual impression of the positive/negative reactions to and/or the most impressive characteristics of the specific media instance as perceived by the viewers.

An example enables graphical presentation and analysis of verbatim comments and feedbacks from a plurality of viewers to a specific media instance. These verbatim comments are first collected from the viewers and stored in a database before being analyzed and categorized into various categories. Once categorized, the comments can then be presented to a user in various graphical formats, allowing the user to obtain an intuitive visual impression of the positive/negative reactions to and/or the most impressive characteristics of the specific media instance, as perceived by the viewers. Instead of parsing through and dissecting the comments and feedbacks word by word, the user is now able to visually evaluate how well the media instance is being received by the viewers at a glance.

Figure 13:
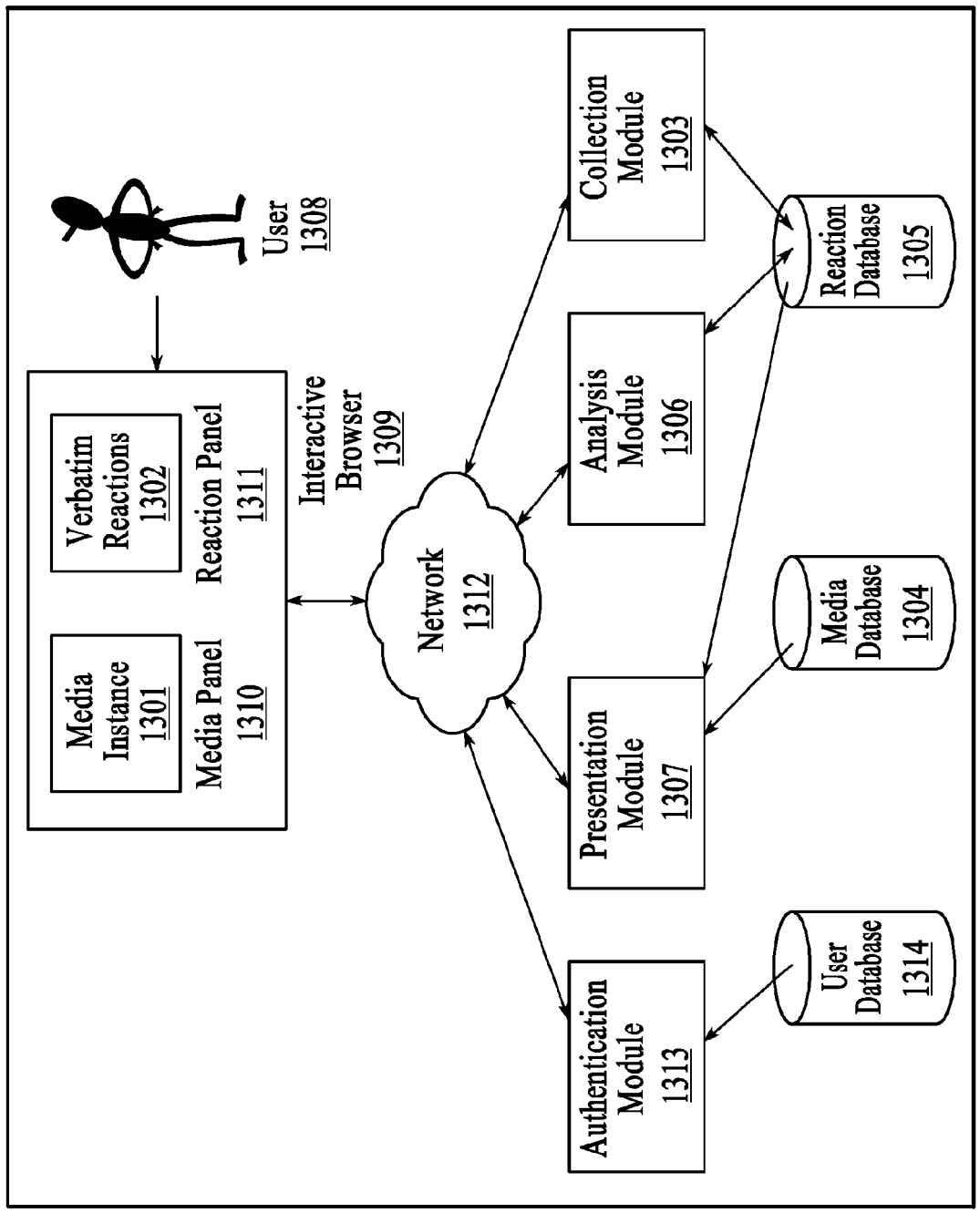
FIG. 13 is an illustration of an exemplary system to support graphical presentation of verbatim comments from viewers.

FIG. 13 is an illustration of an exemplary system to support graphical presentation of verbatim comments from viewers. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 13, a collection module 1303 is operable to collect, record, store and manage verbatim reactions 1302 (comments and feedbacks) from a plurality of viewers of a media instance 1301. Here, the media instance and its pertinent data can be stored in a media database 1304, and the verbatim reactions from the viewers can be stored in a reaction database 1305, respectively. An analysis module 1306 is operable to analyze the verbatim comments from the viewers and categorize them into the plurality of categories. A presentation module 1307 is operable to retrieve and categorize the verbatim reactions to the media instance into various categories, and then present these verbatim reactions to a user 1308 based on their categories in graphical forms via an interactive browser 1309. The interactive browser includes at least two panels—a media panel 1310, which is operable to present, play, and pause the media instance, and a comments panel 1311, which is operable to display not only the one or more reactions corresponding to the media instance, but also one or more graphical categorization and presentation of the verbatim reactions to provide the user with both a verbal and/or a visual perception and interpretation of the feedbacks from the viewers.

Figure 14:
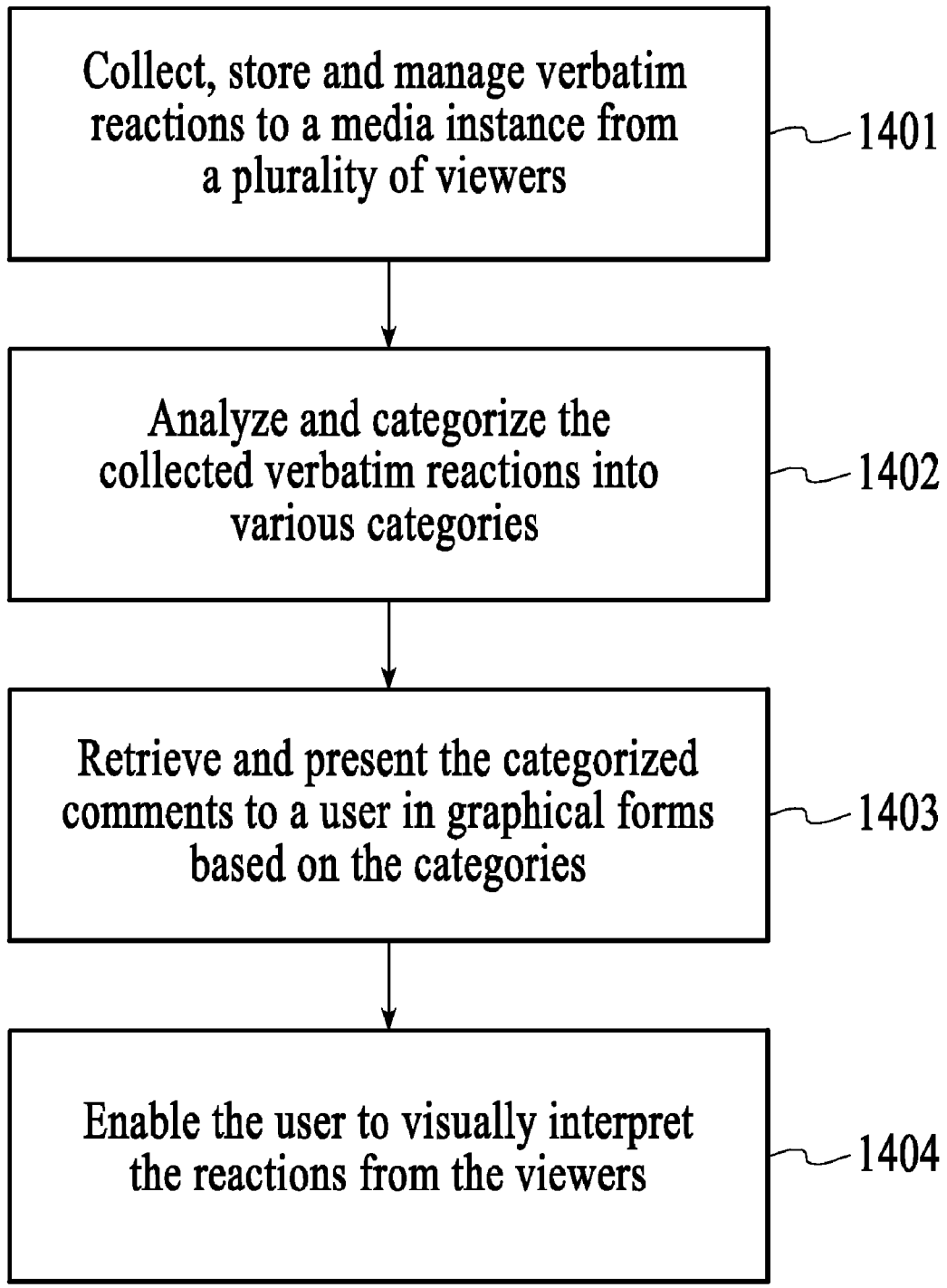
FIG. 14 is a flow chart illustrating an exemplary process to support graphical presentation of verbatim comments from viewers.

FIG. 14 is a flow chart illustrating an exemplary process to support graphical presentation of verbatim comments from viewers. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 14, verbatim reactions to a media instance from a plurality of viewers are collected, stored and managed at step 1401. At step 1402, the collected verbatim reactions are analyzed and categorized into various categories. The categorized comments are then retrieved and presented to a user in graphical forms based on the categories at step 1403, enabling the user to visually interpret the reactions from the viewers at step 1404.

In some examples, the viewers of the media instance are free to write what they like and don't like about the media instance, and the verbatim (free flowing text) comments or feedbacks 501 from the viewers can be recorded and presented in the comments panel 111 verbatim as shown in FIG. 4 described above. In some examples, the analysis module is operable to further characterize the comments in each of the plurality of categories as positive or negative based on the words used in each of the comments. Once characterized, the number of positive or negative comments in each of the categories can be summed up. For a non-limiting example, comments from viewers on a certain type of events, like combat, can be characterized and summed up as being 40% positive, while 60% negative. Such an approach avoids single verbatim response from bias the responses from a group of viewers, making it easy for the user to understand how viewers would react to every aspect of the media instance.

In some examples, the analysis module is operable to characterize the viewers' comments about the media instance as positive or negative in a plurality of categories/topics/aspects related to the product, wherein such categories include but are not limited to, product, event, logo, song, spokesperson, jokes, narrative, key events, storyline. These categories may not be predetermined, but instead be extracted from the analysis of their comments.

Figure 15:
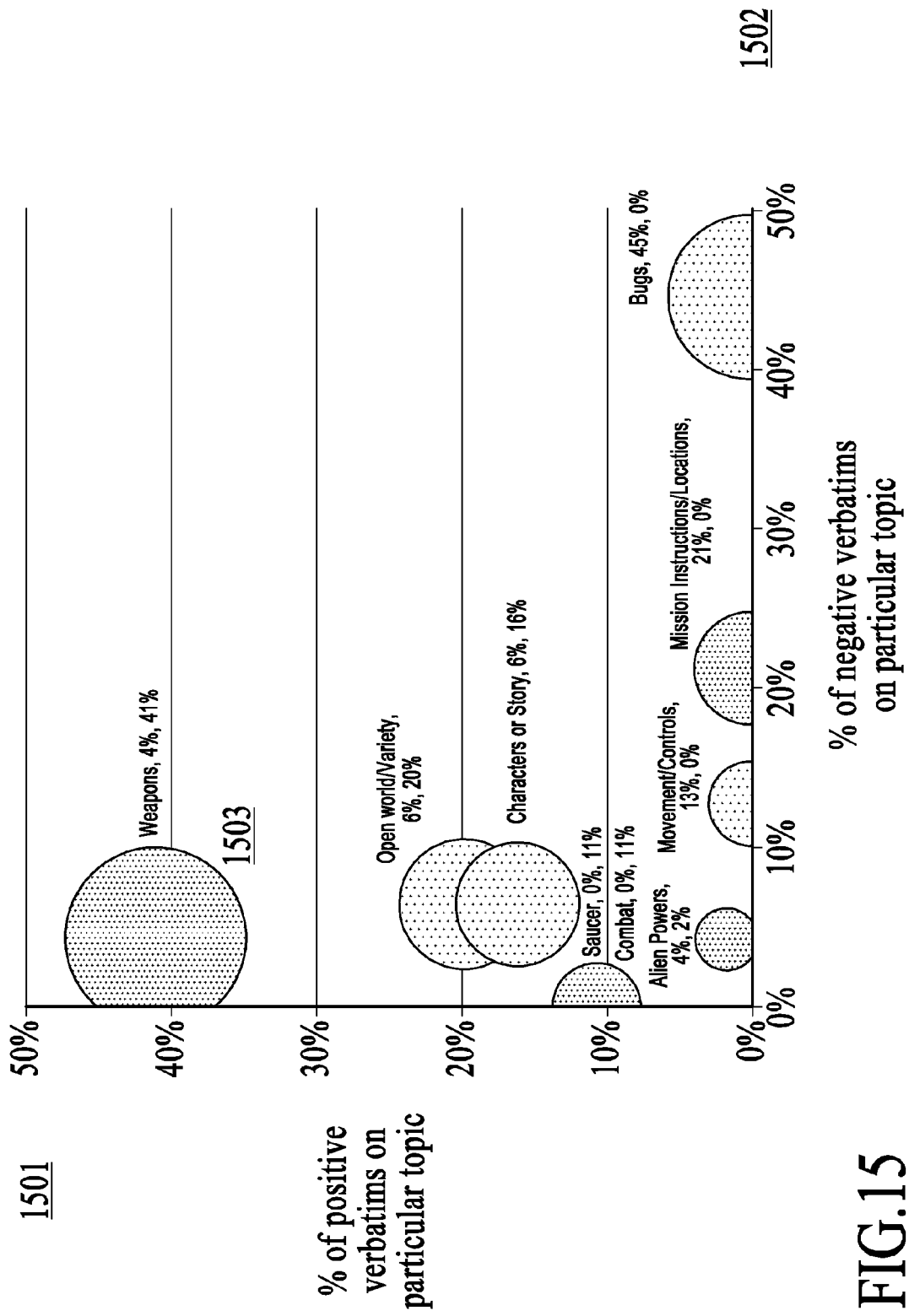
FIG. 15 shows an exemplary bubble graph presenting summation of positive and negative comments from the viewers to various aspects of the media instance.

In some examples, the presentation module is operable to present summation of the viewers' positive and negative comments to various aspects/topics/events of the media instance to the user (creator of the media instance) in a bubble graph, as shown in FIG. 15. The vertical axis 1501 and horizontal axis 1502 of the bubble graph represent the percentage of positive or negative comments from the viewers about the media instance, respectively. Each bubble 1503 in the graph represents one of the topics the viewers have commented upon, marked by the name of the event and the percentages of the viewers' negative and positive feedbacks on the event. The size of the bubble represents the number of viewers commenting on this specific aspect of the media instance, and the location of the bubble on the graph indicates whether the comments from the viewers are predominantly positive or negative.

In some examples, the verbatim comments from the viewers can be analyzed, and key words and concepts (adjectives) can be extracted and presented in a word cloud, as shown in FIG. 16, rendering meaningful information from the verbatim comments more accessible. Every word in the word cloud is represented by a circle, square, any other commonly used geometric shape or simply by the word itself as shown in FIG. 16. Each representation is associated with a corresponding weight represented using font sizes or other visual clues. For the non-limiting example in FIG. 16, the size of each word in the word cloud represents the number of times or percentages of the viewers use the word in their responses. This is useful as a means of displaying "popularity" of an adjective that has been democratically 'voted' on to describe the media instance and where precise results are not desired. Here, the three most popular adjectives used to describe the media instance are "fun", "cool", and "boring".

In some examples, the viewers may simply be asked to answer a specific question, for example, "What are three adjectives that best describe your response to this media." The adjectives in the viewers' responses to the question can then be collected, categorized, and summed up, and presented in a Word cloud. Alternatively, the adjectives the viewers used to describe their responses to the media instance may be extracted from collected survey data.

In some examples, with reference to FIG. 13, an optional authentication module 1313 is operable to authenticate identity of the user requesting access to the media instance and the verbatim reactions remotely over a network 1313. Here, the network can be but is not limited to, internet, intranet, wide area network (WAN), local area network (LAN), wireless network, Bluetooth, and mobile communication network.

In some examples, optional user database 1314 stores information of users who are allowed to access the media instances and the verbatim reactions from the viewers, and the specific media instances and the reactions each user is allowed to access. The access module 1310 may add or remove a user for access, and limit or expand the list of media instances and/or reactions the user can access and/or the analysis features the user can use by checking the user's login name and password. Such authorization/limitation on a user's access can be determined to based upon who the user is, e.g., different amounts of information for different types of users. For a non-limiting example, Company ABC can have access to certain ads and feedback from viewers' reactions to the ads, while Company XYZ cannot have access or can only have limited access to the same ads and/or feedback.

Some of the examples described herein include a method comprising: receiving a media instance, the media instance including a plurality of media events; receiving reaction data from a plurality of viewers while the plurality of viewers are viewing the media instance; generating aggregated reaction data by aggregating the reaction data from the plurality of viewers; generating synchronized data by synchronizing the plurality of media events of the media instance with corresponding aggregated reaction data; and providing controlled access to the synchronized data from a remote device.

The method of a disclosed example comprises providing, via the controlled access, remote interactive manipulation of the reaction data synchronized to corresponding events of the media instance.

The manipulation of a disclosed example includes at least one of dividing, dissecting, aggregating, parsing, organizing, and analyzing the reaction data.

The method of a disclosed example comprises providing controlled access to at least one of the reaction data and aggregated reaction data.

The method of a disclosed example comprises enabling via the controlled access interactive analysis of at least one of the media instance and the synchronized data.

The method of a disclosed example comprises enabling via the controlled access interactive analysis of at least one of the reaction data, the aggregated reaction data, and parsed reaction data.

The reaction data of a disclosed example includes at least one of physiological responses, survey results, feedback generated by the viewers, metadata, and derived statistics.

The reaction data of a disclosed example includes physiological responses.

The reaction data of a disclosed example includes survey results.

The reaction data of a disclosed example includes feedback generated by the viewers.

The reaction data of a disclosed example includes metadata, wherein the metadata is event-based metadata.

The reaction data of a disclosed example includes derived statistics, wherein the derived statistics are derived statistics for indicators of success and failure of the media instance Receiving the reaction data of a disclosed example comprises receiving the reaction data from a plurality of sensor devices via wireless couplings, wherein each viewer wears a sensor device of the plurality of sensor devices.

The method of a disclosed example comprises presenting a user interface (UI), wherein the controlled access is made via the UI.

The method of a disclosed example comprises presenting the synchronized data using a rendering of a plurality or renderings.

The plurality of renderings of a disclosed example includes text, charts, graphs, histograms, images, and video.

The aggregating of a disclosed example comprises aggregating the reaction data according to at least one of maximums, minimums, averages, deviations, derivatives, amplitudes, and trends of at least one parameter of the reaction data.

The method of a disclosed example comprises selecting, via the controlled access, a portion of the media instance for which at least one of the synchronized data, the reaction data, the aggregated reaction data, and parsed reaction data is viewed. The portion of a disclosed example includes a point in time. The portion of a disclosed example includes a period of time.

The method of a disclosed example comprises automatically analyzing the reaction data.

The method of a disclosed example comprises providing remote access to results of the analyzing, and presenting the results, the presenting including presenting actionable insights corresponding to a portion of the media instance via at least one of a plurality of renderings, wherein the actionable insights correspond to emotional reactions of the plurality of viewers.

The analyzing of a disclosed example includes applying expert knowledge of physiological behavior to the reaction data.

The method of a disclosed example comprises generating a first set of questions that represent the results.

The analyzing of a disclosed example includes analyzing the reaction data in the context of the first set of questions.

The method of a disclosed example comprises selecting at least one rendering of the plurality of renderings.

The method of a disclosed example comprises tagging the selected rendering with at least one question of the first set of questions.

A user of a disclosed example can modify the presenting of the results via the selecting of at least one rendering of the plurality of renderings.

The presenting of a disclosed example includes presenting the results via presentation of the first set of questions.

The method of a disclosed example comprises, in response to the user selecting a question of the first set of questions, presenting an answer to the selected question that includes the actionable insight.

The method of a disclosed example comprises receiving comments from the plurality of viewers in response to the viewing. The comments of a disclosed example are textual comments. The synchronized data of a disclosed example includes the comments.

The method of a disclosed example comprises presenting survey questions to the plurality of viewers, the survey questions relating to the media instance. The method of a disclosed example comprises receiving answers to the survey questions from the plurality of viewers. The answers to the survey questions of a disclosed example are textual comments. The synchronized data of a disclosed example includes the answers to the survey questions.

The plurality of viewers of a disclosed example is at a location.

The plurality of viewers of a disclosed example is at a plurality of locations.

A first set of the plurality of viewers of a disclosed example is at a first location and a second set of the plurality of viewers is at a second location different from the first location.

A first set of the plurality of viewers of a disclosed example is viewing the media instance at a first time and a second set of the plurality of viewers is viewing the media instance at a second time different from the first time.

The reaction data of a disclosed example corresponds to electrical activity in brain tissue of the user.

The reaction data of a disclosed example corresponds to electrical activity in muscle tissue of the user.

The reaction data of a disclosed example corresponds to electrical activity in heart tissue of the user.

Examples described herein include a method comprising: receiving a media instance; receiving reaction data from a plurality of viewers, the reaction data generated in response to viewing of the media instance and including physiological response data; aggregating the reaction data from the plurality of viewers; and providing remote access to at least one of the reaction data and aggregated reaction data, wherein the remote access enables interactive analysis of at least one of the media instance, the reaction data, aggregated reaction data, and parsed reaction data.

Examples described herein include a method comprising: receiving a media instance; receiving reaction data from a plurality of viewers, the reaction data generated in response to viewing of the media instance and including physiological response data; aggregating the reaction data from the plurality of viewers; and enabling remote interactive analysis of the media instance and at least one of the reaction data, aggregated reaction data, and parsed reaction data.

Examples described herein include a method comprising: receiving a media instance; receiving reaction data from a plurality of viewers, the reaction data generated in response to viewing of the media instance and including physiological response data; and enabling remote interactive manipulation of the reaction data synchronized to corresponding events of the media instance, the manipulation including at least one of dividing, dissecting, aggregating, parsing, and analyzing the reaction data.

Examples described herein include a system comprising: a processor coupled to a database, the database including a media instance and reaction data, the media instance comprising a plurality of media events, the reaction data received from a plurality of viewers viewing the media instance; a first module coupled to the processor, the first module generating aggregated reaction data by aggregating the reaction data from the plurality of viewers, the first module generating synchronized data by synchronizing the plurality of media events of the media instance with corresponding aggregated reaction data; and a second module coupled to the processor, the second module comprising a plurality of renderings and a user interface (UI) that provide controlled access to the synchronized data from a remote device.

The controlled access of a disclosed example is through the UI and includes remote interactive manipulation of the reaction data synchronized to corresponding events of the media instance.

The manipulation of a disclosed example includes at least one of dividing, dissecting, aggregating, parsing, organizing, and analyzing the reaction data.

The controlled access of a disclosed example includes access to at least one of the reaction data and aggregated reaction data.

The controlled access of a disclosed example includes interactive analysis of at least one of the media instance and the synchronized data.

The controlled access of a disclosed example includes interactive analysis of at least one of the reaction data, the aggregated reaction data, and parsed reaction data.

The plurality of renderings of a disclosed example includes text, charts, graphs, histograms, images, and video.

The UI of a disclosed example presents the synchronized data using at least one rendering of the plurality or renderings.

The UI of a disclosed example allows selection of a portion of the media instance for which at least one of the synchronized data, the reaction data, the aggregated reaction data, and parsed reaction data is viewed. The portion of a disclosed example includes a point in time. The portion of a disclosed example includes a period of time.

The first module of a disclosed example analyzes the reaction data.

The UI of a disclosed example provides remote access to results of the analysis.

The UI of a disclosed example presents the results using at least one rendering of the plurality of renderings, the results including actionable insights corresponding to a portion of the media instance.

The actionable insights of a disclosed example correspond to emotional reactions of the plurality of viewers.

The analyzing of a disclosed example comprises applying expert knowledge of physiological behavior to the reaction data.

The system of a disclosed example comprises generating a first set of questions that represent the results.

The analyzing of a disclosed example includes analyzing the reaction data in the context of the first set of questions.

The system of a disclosed example comprises selecting at least one rendering of the plurality of renderings.

The system of a disclosed example comprises tagging the selected rendering with at least one question of the first set of questions.

A user of a disclosed example can modify presentation of the results via the UI by selecting at least one rendering of the plurality of renderings.

The presenting of a disclosed example includes presenting the results via presentation of the first set of questions on the UI.

The system of a disclosed example comprises, in response to the user selecting a question of the first set of questions, presenting via the UI an answer to the selected question that includes the actionable insight.

The reaction data of a disclosed example includes at least one of physiological responses, survey results, feedback generated by the viewers, metadata, and derived statistics.

The reaction data of a disclosed example includes physiological responses.

The reaction data of a disclosed example includes survey results.

The reaction data of a disclosed example includes feedback generated by the viewers.

The reaction data of a disclosed example includes metadata. The metadata of a disclosed example is event-based metadata.

The reaction data of a disclosed example includes derived statistics. The derived statistics of a disclosed example are derived statistics for indicators of success and failure of the media instance.

The system of a disclosed example comprises a plurality of sensor devices, wherein each viewer wears a sensor device of the plurality of sensor devices, wherein each sensor device receives the reaction data from a corresponding view and transmits the reaction data to at least one of the first module and the database.

The aggregating of a disclosed example comprises aggregating the reaction data according to at least one of maximums, minimums, averages, deviations, derivatives, amplitudes, and trends of at least one parameter of the reaction data.

The system of a disclosed example comprises a third module coupled to the second module, the third module receiving comments from the plurality of viewers in response to the viewing. The comments of a disclosed example are textual comments. The synchronized data of a disclosed example includes the comments.

The system of a disclosed example comprises a third module coupled to the second module, the third module presenting survey questions to the plurality of viewers via the UI, the survey questions relating to the media instance.

The third module of a disclosed example receives answers to the survey questions from the plurality of viewers via the UI. The answers to the survey questions of a disclosed example are textual comments. The synchronized data of a disclosed example includes the answers to the survey questions.

The plurality of viewers of a disclosed example is at a location.

The plurality of viewers of a disclosed example is at a plurality of locations.

A first set of the plurality of viewers of a disclosed example is at a first location and a second set of the plurality of viewers are at a second location different from the first location.

A first set of the plurality of viewers of a disclosed example is viewing the media instance at a first time and a second set of the plurality of viewers are viewing the media instance at a second time different from the first time.

The reaction data of a disclosed example corresponds to electrical activity in brain tissue of the user.

The reaction data of a disclosed example corresponds to electrical activity in muscle tissue of the user.

The reaction data of a disclosed example corresponds to electrical activity in heart tissue of the user.

Examples described herein include a system comprising: a processor coupled to a database, the database including a media instance and reaction data of a plurality of viewers, the reaction data generated in response to viewing of the media instance and including physiological response data; a first module that aggregates the reaction data from the plurality of viewers; and a second module that provides remote access to at least one of the reaction data and aggregated reaction data, wherein the remote access enables interactive analysis of at least one of the media instance, the reaction data, aggregated reaction data, and parsed reaction data.

Examples described herein include a system comprising: a processor coupled to a database, the database receiving a media instance and reaction data from a plurality of viewers, the reaction data generated in response to viewing of the media instance and including physiological response data; a first module aggregating the reaction data from the plurality of viewers; and a second module enabling remote interactive analysis and presentation of the media instance and at least one of the reaction data, aggregated reaction data, and parsed reaction data.

Examples described herein include a system comprising: a processor coupled to a database, the database receiving a media instance and reaction data from a plurality of viewers, the reaction data generated in response to viewing of the media instance and including physiological response data; and an interface coupled to the processor, the interface enabling remote interactive manipulation of the reaction data synchronized to corresponding events of the media instance, the manipulation including at least one of dividing, dissecting, aggregating, parsing, and analyzing the reaction data.

Examples described herein include a method comprising: receiving a media instance, the media instance including a plurality of media events; receiving reaction data from a plurality of viewers while the plurality of viewers are viewing the media instance; automatically analyzing the reaction data; and providing remote access to results of the analyzing, and presenting the results, the presenting including presenting actionable insights corresponding to a portion of the media instance via at least one of a plurality of renderings, wherein the actionable insights correspond to emotional reactions of the plurality of viewers.

The analyzing of a disclosed example includes applying expert knowledge of physiological behavior to the reaction data.

The method of a disclosed example comprises generating a first set of questions that represent the results.

The analyzing of a disclosed example includes analyzing the reaction data in the context of the first set of questions.

The method of a disclosed example comprises selecting at least one rendering of the plurality of renderings.

The method of a disclosed example comprises tagging the selected rendering with at least one question of the first set of questions.

A user of a disclosed example can modify the presenting of the results via the selecting of at least one rendering of the plurality of renderings.

The presenting of a disclosed example includes presenting the results via presentation of the first set of questions.

The method of a disclosed example comprises, in response to the user selecting a question of the first set of questions, presenting an answer to the selected question that includes the actionable insight.

The method of a disclosed example comprises selecting a second set of questions that represent the results, wherein the second set of questions were generated prior to the first set of questions to represent previous results from analysis of preceding reaction data of a preceding media instance, wherein the preceding reaction data is similar to the reaction data.

The analyzing of a disclosed example includes analyzing the reaction data in the context of the second set of questions.

The method of a disclosed example comprises selecting at least one rendering of the plurality of renderings.

The method of a disclosed example comprises tagging the selected rendering with at least one question of the second set of questions.

A user of a disclosed example can modify the presenting of the results via the selecting of at least one rendering of the plurality of renderings.

The presenting of a disclosed example includes presenting the results via presentation of the second set of questions.

The method of a disclosed example comprises, in response to the user selecting a question of the second set of questions, presenting an answer to the selected question that includes the actionable insight.

The method of a disclosed example comprises selecting a set of the reaction data to which the analyzing is applied, the selecting including selecting a portion of the media instance to which the set of the reaction data corresponds. The portion of a disclosed example includes a point in time. The portion of a disclosed example includes a period of time.

The method of a disclosed example comprises generating aggregated reaction data by aggregating the reaction data from the plurality of viewers.

The aggregating of a disclosed example comprises aggregating the reaction data according to at least one of maximums, minimums, averages, deviations, derivatives, amplitudes, and trends of at least one parameter of the reaction data.

The method of a disclosed example comprises generating synchronized data by synchronizing the plurality of media events of the media instance with the reaction data.

The method of a disclosed example comprises enabling remote interactive manipulation of the media instance.

The method of a disclosed example comprises enabling remote interactive manipulation of the reaction data.

The method of a disclosed example comprises enabling remote interactive manipulation of the plurality of renderings.

The method of a disclosed example comprises enabling remote interactive manipulation of the actionable insights.

The plurality of renderings of a disclosed example includes text, charts, graphs, histograms, images, and video.

The reaction data of a disclosed example includes at least one of physiological responses, survey results, feedback generated by the viewers, metadata, and derived statistics The reaction data of a disclosed example includes physiological responses The reaction data of a disclosed example includes survey results.

The reaction data of a disclosed example includes feedback generated by the viewers.

The reaction data of a disclosed example includes metadata, wherein the metadata is event-based metadata.

The reaction data of a disclosed example includes derived statistics, wherein the derived statistics are derived statistics for indicators of success and failure of the media instance.

Receiving the reaction data of a disclosed example comprises receiving the reaction data from a plurality of sensor devices via wireless couplings, wherein each viewer wears a sensor device of the plurality of sensor devices.

The reaction data of a disclosed example corresponds to electrical activity in brain tissue of the user.

The reaction data of a disclosed example corresponds to electrical activity in muscle tissue of the user.

The reaction data of a disclosed example corresponds to electrical activity in heart tissue of the user.

A first set of the plurality of viewers of a disclosed example is at a first location and a second set of the plurality of viewers is at a second location different from the first location.

A first set of the plurality of viewers of a disclosed example is viewing the media instance at a first time and a second set of the plurality of viewers is viewing the media instance at a second time different from the first time.

Examples described herein include a method comprising: receiving a media instance; receiving reaction data from a plurality of viewers while the plurality of viewers are viewing the media instance; automatically analyzing the reaction data; and presenting the results by presenting actionable insights corresponding to a portion of the media instance via at least one of a plurality of renderings, wherein the actionable insights correspond to emotional reactions of the plurality of viewers.

Examples described herein include a method comprising: receiving a media instance; receiving reaction data from a plurality of viewers viewing the media instance; analyzing the reaction data; and presenting results of the analyzing by presenting a set of questions corresponding to a portion of the media instance, the set of questions corresponding to at least one of a plurality of renderings, wherein answers to questions of the set of questions present actionable insights of the reaction data, the actionable insights corresponding to emotional reactions of the plurality of viewers.

Examples described herein include a system comprising: a processor coupled to a database, the database including a media instance and reaction data, the media instance including a plurality of media events, the reaction data received from a plurality of viewers while the plurality of viewers are viewing the media instance; a first module coupled to the processor, the first module analyzing the reaction data; and a second module coupled to the processor, the second module comprising a plurality of renderings and a user interface (UI) that provide remote access to results of the analyzing and the results, the results including actionable insights corresponding to a portion of the media instance, wherein the actionable insights correspond to emotional reactions of the plurality of viewers.

The analyzing of a disclosed example includes applying expert knowledge of physiological behavior to the reaction data.

The first module of a disclosed example generates a first set of questions that represent the results.

The analyzing of a disclosed example includes analyzing the reaction data in the context of the first set of questions.

At least one of the second module and the UI of a disclosed example enables selection of at least one rendering of the plurality of renderings.

At least one of the second module and the UI of a disclosed example enables tagging of a selected rendering with at least one question of the first set of questions.

A user of a disclosed example can modify presentation of the results via the UI by selecting at least one rendering of the plurality of renderings.

At least one of the second module and the UI of a disclosed example presents the results via presentation of the first set of questions.

In response to receipt of a selected question of the first set of questions, the second module of a disclosed example presents an answer to the selected question that includes the actionable insight.

The first module of a disclosed example selects a second set of questions that represent the results, wherein the second set of questions were generated prior to the first set of questions to represent previous results from analysis of preceding reaction data of a preceding media instance, wherein the preceding reaction data is similar to the reaction data.

The analyzing of a disclosed example includes analyzing the reaction data in the context of the second set of questions.

The UI of a disclosed example enables selection of at least one rendering of the plurality of renderings.

The method of a disclosed example comprises tagging the selected rendering with at least one question of the second set of questions.

A user of a disclosed example can modify presentation of the results via the UI by the selecting of at least one rendering of the plurality of renderings.

At least one of the second module and the UI of a disclosed example presents the results via presentation of the second set of questions.

In response to the user selecting a question of the second set of questions, at least one of the second module and the UI of a disclosed example presents an answer to the selected question that includes the actionable insight.

The UI of a disclosed example enables selection of a set of the reaction data to which the analyzing is applied, the selecting including selecting a portion of the media instance to which the set of the reaction data corresponds. The portion of a disclosed example includes a point in time. The portion of a disclosed example includes a period of time.

The first module of a disclosed example generates aggregated reaction data by aggregating the reaction data from the plurality of viewers.

The aggregating of a disclosed example comprises aggregating the reaction data according to at least one of maximums, minimums, averages, deviations, derivatives, amplitudes, and trends of at least one parameter of the reaction data.

The method of a disclosed example comprises generating synchronized data by synchronizing the plurality of media events of the media instance with the reaction data.

The method of a disclosed example comprises enabling remote interactive manipulation of the media instance via the UI.

The method of a disclosed example comprises enabling remote interactive manipulation of the reaction data via the UI.

The method of a disclosed example comprises enabling remote interactive manipulation of the plurality of renderings via the UI.

The method of a disclosed example comprises enabling remote interactive manipulation of the actionable insights via the UI.

The plurality of renderings of a disclosed example includes text, charts, graphs, histograms, images, and video.

The reaction data of a disclosed example includes at least one of physiological responses, survey results, feedback generated by the viewers, metadata, and derived statistics.

The reaction data of a disclosed example includes physiological responses.

The reaction data of a disclosed example includes survey results.

The reaction data of a disclosed example includes feedback generated by the viewers.

The reaction data of a disclosed example includes metadata, wherein the metadata is event-based metadata.

The reaction data of a disclosed example includes derived statistics, wherein the derived statistics are derived statistics for indicators of success and failure of the media instance.

The method of a disclosed example comprises a plurality of sensor devices, wherein each viewer wears a sensor device of the plurality of sensor devices, wherein each sensor device receives the reaction data from a corresponding view and transmits the reaction data to at least one of the first module and the database.

The reaction data of a disclosed example corresponds to electrical activity in brain tissue of the user.

The reaction data of a disclosed example corresponds to electrical activity in muscle tissue of the user.

The reaction data of a disclosed example corresponds to electrical activity in heart tissue of the user.

A first set of the plurality of viewers of a disclosed example is at a first location and a second set of the plurality of viewers of a disclosed example is at a second location different from the first location.

A first set of the plurality of viewers of a disclosed example is viewing the media instance at a first time and a second set of the plurality of viewers is viewing the media instance at a second time different from the first time.

Examples described herein include a system comprising: a processor coupled to a database, the database receiving a media instance and reaction data from a plurality of viewers while the plurality of viewers are viewing the media instance; a first module coupled to the processor, the first module automatically analyzing the reaction data; and a second module coupled to the processor, the second module presenting the results by presenting actionable insights corresponding to a portion of the media instance via at least one of a plurality of renderings, wherein the actionable insights correspond to emotional reactions of the plurality of viewers.

Examples described herein include a system comprising: a processor coupled to a database, the database receiving a media instance and reaction data from a plurality of viewers viewing the media instance; a first module coupled to the processor, the first module analyzing the reaction data; and a second module coupled to the processor, the second module presenting results of the analyzing by presenting a set of questions corresponding to a portion of the media instance, the set of questions corresponding to at least one of a plurality of renderings, wherein answers to questions of the set of questions present actionable insights of the reaction data, the actionable insights corresponding to emotional reactions of the plurality of viewers.

Examples described herein may be implemented using a conventional general purpose or a specialized digital computer or microprocessor(s) programmed according to the teachings of the present disclosure, as will be apparent to those skilled in the computer art Appropriate software coding can readily be prepared by skilled programmers based on the teachings of the present disclosure, as will be apparent to those skilled in the software art. The teachings of this disclosure may also be implemented by the preparation of integrated circuits or by interconnecting an appropriate network of conventional component circuits, as will be readily apparent to those skilled in the art.

A disclosed example includes a computer program product which is a machine readable medium (media) having instructions stored thereon/in which can be used to program one or more computing devices to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the teachings of the present disclosure include software for controlling both the hardware of the general purpose/specialized computer or microprocessor, and for enabling the computer or microprocessor to interact with a human viewer or other mechanism utilizing the results of the teachings of this disclosure. Such software may include, but is not limited to, device drivers, operating systems, execution environments/containers, and applications.

The examples described herein include and/or run under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, cellular telephones, personal digital assistants, portable computing devices, and portable communication devices, but is not so limited. The processing system can include components within a larger computer system.

The processing system of a disclosed example includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components of the systems described herein, and/or provided by some combination of algorithms. The methods described herein can be implemented in one or more of software algorithm(s), programs, firmware, hardware, components, circuitry, in any combination.

The components described herein can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods include: microcontrollers with memory (such as electronically erasable programmable read only memory (EEPROM)), embedded microprocessors, firmware, software, etc. Furthermore, aspects of the systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, HTTPs, FTP, SMTP, WAP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of example systems and methods is not intended to be exhaustive or to limit the systems and methods to the precise forms disclosed. While specific examples of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above.

The elements and acts of the various examples described above can be combined to provide other examples. These and other changes can be made to the systems and methods in light of the above detailed description.

In general, in the following claims, the terms used should not be construed to limit the claims to the specific examples disclosed in the specification and the claims, but should be construed to include all systems and methods under the claims. Accordingly, the examples are not limited by the disclosure, but instead the scope of the examples is to be determined entirely by the claims.

While certain aspects of the examples are presented below in certain claim forms, the inventors contemplate the various aspects of the examples in any number of claim forms. Accordingly, the inventors reserve the right to add additional claims after filing the application to pursue such additional claim forms for other aspects disclosed in the various examples.

What is claimed is:

1. A system comprising a processor, the processor implements:

an electronic synchronizer to:

determine a total amount to offset first-neuro-response data gathered from an audience member exposed to media to align the first neuro-response data with second neuro-response data simultaneously gathered from the audience member, the first neuro-response data associated with a first sensory component of the media and the second neuro-response data associated with a second sensory component of the media, the total amount to offset based on a first cognitive delay of a brain of the audience member associated with the first neuro-response data and a second cognitive delay of the brain of the audience member associated with the second neuro-response data, wherein the first sensory component of the media is observed by a first sense of the audience member and the second sensory component of the media is observed by a second sense of the audience member different than the first sense; and time shift at least one of the first neuro-response data or the second neuro-response based on the total amount to form aligned data; and an electronic analyzer to:

determine an effectiveness of the media based on the aligned data;

receive a user request for a first study of a plurality of studies;

analyze one or more of the first neuro-response data, the second neuro-response data, the aligned data, or the effectiveness to determine an analysis result for the first study;

output a first rendering of a plurality of renderings for display of the analysis result with the one or more of the first neuro-response data, the second neuro-response data, the aligned data, or the effectiveness; and synchronize a display of a respective first portion of the one or more of the first neuro-response data, the second neuro-response data, the aligned data, or the effectiveness with a display of a first portion of the first rendering and synchronize a display of a respective second portion of the one or more of the first neuro-response data, the second neuro-response data, the aligned data, or the effectiveness with a display of a second portion of the first rendering.

2. The system of claim 1, wherein the first sensory component of the media includes a visual component and the second sensory component of the media includes an auditory component.

3. The system of claim 1, wherein the first cognitive delay is different from the second cognitive delay.

4. The system of claim 1, wherein the audience member is a first audience member and the aligned data is first aligned data and the electronic synchronizer is to time shift one or more of third neuro-response data or fourth neuro-response data gathered from a second audience member exposed to the media to align the third neuro-response data and the fourth neuro-response data to form second aligned data, the third neuro-response data and the fourth neuro-response data simultaneously gathered from the second audience member, the third neuro-response data associated with the first sensory component and the fourth neuro-response data associated with the second sensory component.

5. The system of claim 4, wherein the electronic analyzer is to:
perform a comparison of the first aligned data and the second aligned data; and
determine the effectiveness of the media based on the comparison.

6. The system of claim 4, wherein the electronic analyzer is to aggregate the first aligned data with the second aligned data to form aggregated data to be displayed with the media.

7. The system of claim 1, wherein the electronic synchronizer is to time shift one or more of the first neuro-response data or the second neuro-response data by a preliminary amount to account for a time zone difference between a location of the audience member and a location of the electronic synchronizer.

8. The system of claim 1, wherein the aligned data is first aligned data and the electronic synchronizer is to time shift third neuro-response data gathered from the audience member to align the third neuro-response with fourth neuro-response data to form second aligned data, the third neuro-response data and the fourth neuro-response data simultaneously gathered from the audience member at a point in time subsequent to the gathering of the first neuro-response data and the second neuro-response data, the third neuro-response data associated with the first sensory component and the second neuro-response data associated with the second sensory component.

9. The system of claim 8, wherein the electronic synchronizer is to aggregate the first aligned data and the second aligned data to form aggregated data.

10. The system of claim 8, wherein the electronic analyzer is to determine the effectiveness based on the aggregated data.

11. The system of claim 1, wherein the electronic analyzer is to:

tag the plurality of renderings with one or more of the plurality of studies; and
configure a display to present one or more of the plurality of renderings in response to a user request for a second study based on the tagging.

12. The system of claim 11, wherein the media is first media and the first study is for the first media and the second study is for second media different from the first media.

13. The system of claim 1, wherein the media includes a first media instance and a second media instance, the electronic analyzer to output the first rendering to be displayed based on the first media instance and dynamically update the output for display of a second rendering based on the second media instance.

14. The system of claim 1, wherein the electronic analyzer is to graphically mark a portion of the one or more of the first neuro-response data, the second neuro-response data, the aligned data, or the effectiveness based on the analysis result.

15. The system of claim 1, wherein the first rendering further includes at least a portion of the media.

16. The system of claim 1, wherein the electronic analyzer is to synchronize the display of the respective first portion of the one or more of the first neuro-response data, the second neuro-response data, the aligned data, or the effectiveness with the display of the first portion of the first rendering based on a first user input associated with the first rendering, the first user input received via an interface for display of the first rendering.

17. The system of claim 1, wherein the electronic analyzer is to substantially continuously synchronize the display of the respective first portion of the one or more of the first neuro-response data, the second neuro-response data, the aligned data, or the effectiveness with the display of the first portion of the first rendering.

18. A system comprising:
a processor to:
offset at least one of first neuro-response data representing a first response to a visual component of media gathered from an audience member exposed to the media and second neuro-response data representing a second response to an auditory component of the media gathered from the audience member exposed to the media based on a first cognitive delay of a brain of the audience member and a second cognitive delay of the brain of the audience member to synchronize the at least one of the first neuro-response data and the second neuro-response data with the media, the first cognitive delay and the second cognitive delay being different;
receive a user request for a first study of a plurality of studies;
analyze one or more of the first neuro-response data, the second neuro-response data, or the synchronized neuro-response data to determine an analysis result for the first study;
output a first rendering of a plurality of renderings for display of the analysis result with the one or more of the first neuro-response data, the second neuro-response data, or the synchronized neuro-response data; and
synchronize a display of a respective first portion of the one or more of the first neuro-response data, the second neuro-response data, or the synchronized neuro-response data with a display of a first portion of the first rendering and synchronize a display of a respective second portion of the one or more of the first neuro-response data, the second neuro-response data, or the synchronized neuro-response data with a display of a second portion of the first rendering; and a database to store one or more of the media, the first neuro-response data, the second neuro-response data, the synchronized neuro-response data, the analysis result, or the first rendering.

19. The system of claim 18, wherein the processor is to offset the at least one of the first neuro-response data and the second neuro-response data substantially continuously over a duration of the media.

20. The system of claim 18, wherein the media includes a plurality of events and the processor is to identify an event in the media and synchronize the event with the at least one of the first neuro-response data or the second neuro-response data.

21. The system of claim 18, wherein the processor is to aggregate neuro-response data for a plurality of audience members exposed to the media with the first neuro-response data and the second neuro-response data.

22. The system of claim 21, wherein the processor is to identify a change in amplitude in the aggregated neuro-response data.

23. The system of claim 22, wherein the change in amplitude is indicative of a change in an emotional state of at least one person of the plurality of audience members.

24. The system of claim 22, wherein the processor is to identify the media as a success or a failure in invoking an emotional response across the plurality of audience members based on the change in amplitude.

25. A method comprising:
determining, by executing an instruction with a processor, a total amount to offset first-neuro-response data gathered from an audience member exposed to media to align the first neuro-response data with second neuro-response data simultaneously gathered from the audience member, the first neuro-response data associated with a first sensory component of the media and the second neuro-response data associated with a second sensory component of the media, the total amount to offset based on a first cognitive delay of a brain of the audience member associated with the first neuro-response data and a second cognitive delay of the brain of the audience member associated with the second neuro-response data, wherein the first sensory component of the media is observed by a first sense of the audience member and the second sensory component of the media is observed by a second sense of the audience member different than the first sense;

time shifting, by executing an instruction with the processor, at least one of the first neuro-response data or the second neuro-response based on the total amount to form aligned data;

determining, by executing an instruction with the processor, an effectiveness of the media based on the aligned data;

receiving a user request for a first study of a plurality of studies;

analyzing, by executing an instruction with the processor, one or more of the first neuro-response data, the second neuro-response data, the aligned data, or the effectiveness to determine an analysis result for the first study;

outputting, by executing an instruction with the processor, a first rendering of a plurality of renderings for display of the analysis result with the one or more of the first neuro-response data, the second neuro-response data, the aligned data, or the effectiveness; and synchronizing, by executing an instruction with the processor, a display of a respective first portion of the one or more of the first neuro-response data, the second neuro-response data, the aligned data, or the effectiveness with a display of a first portion of the first rendering and synchronizing a display of a respective second portion of the one or more of the first neuro-response data, the second neuro-response data, the aligned data, or the effectiveness with a display of a second portion of the first rendering.

26. The method of claim 25, wherein the first sensory component of the media is a visual component and the second sensory component of the media is an auditory component.

27. The method of claim 25, wherein the first cognitive delay is different from the second cognitive delay.

28. The method of claim 25, wherein the audience member is a first audience member and the aligned data is first aligned data and further including time shifting one or more of third neuro-response data or fourth neuro-response data gathered from a second audience member exposed to the media to align the third neuro-response data and the fourth neuro-response data to form second aligned data, the third neuro-response data associated with the first sensory component and the fourth neuro-response data associated with the second sensory component.

29. The method of claim 28, further including:
performing a comparison of the first aligned data and the second aligned data; and
determining the effectiveness of the media based on the comparison.

30. The method of claim 25, wherein the aligned data is first aligned data and further including time shifting third neuro-response data gathered from the audience member to align the third neuro-response with fourth neuro-response data to form second aligned data, the third neuro-response data and the fourth neuro-response data simultaneously gathered from the audience member at a point in time subsequent to the gathering of the first neuro-response data and the second neuro-response data, the third neuro-response data associated with the first sensory component and the second neuro-response data associated with the second sensory component.

31. The method of claim 30, further including aggregating the first aligned data and the second aligned data to form aggregated data.

32. The method of claim 31, further including determining the effectiveness based on a trend in the aggregated data.

33. A method comprising:
synchronizing, by executing an instruction with a processor, media with at least one of first neuro-response data representing a first response to a visual component of media gathered from an audience member exposed to the media and second neuro-response data representing a second response to an auditory component of the media gathered from the audience member exposed to the media by offsetting at least one of the first neuro-response data and the second neuro-response data based on a first cognitive delay of a brain of the audience member and a second cognitive delay of the brain of the audience member, the first cognitive delay and the second cognitive delay being different;

receiving a user request for a first study of a plurality of studies;

analyzing, by executing an instruction with the processor, one or more of the first neuro-response data, the second neuro-response data, or the synchronized neuro-response data to determine an analysis result for the first study;

outputting, by executing an instruction with the processor, a first rendering of a plurality of renderings for display of the analysis result with the one or more of the first neuro-response data, the second neuro-response data, or the synchronized neuro-response data;

synchronizing, by executing an instruction with the processor, a display of a respective first portion of the one or more of the first neuro-response data, the second neuro-response data, or the synchronized neuro-response data with a display of a first portion of the first rendering and synchronizing a display of a respective second portion of the one or more of the first neuro-response data, the second neuro-response data, or the synchronized neuro-response data with a display of a second portion of the first rendering; and storing, by executing an instruction with the processor, one or more of the media, the first neuro-response data, the second neuro-response data, the synchronized data, the analysis result, or the first rendering.

34. The method of claim 33, further including synchronizing the media with the at least one of the first neuro-response data or the second neuro-response data substantially continuously over a duration of the media.

35. The method of claim 33, wherein the media includes a plurality of events and further including identifying an event in the media and synchronizing the event with the at least one of the first neuro-response data or the second neuro-response data.

36. The method of claim 33, further including aggregating neuro-response data for a plurality of audience members exposed to the media.

37. The method of claim 36, further including identifying a change in amplitude in the aggregated neuro-response data.

38. The method of claim 37, wherein the change in amplitude is indicative of a change in an emotional state of an audience of the media.

39. The method of claim 33, further including identifying the media as a success or a failure in invoking an emotional response in an audience of the media based on the change in amplitude.

* * * * *